(12) United States Patent
Friedman et al.

(10) Patent No.: US 8,060,606 B2
(45) Date of Patent: Nov. 15, 2011

(54) GEO-INTELLIGENT TRAFFIC REPORTER

(75) Inventors: Robert B. Friedman, Decatur, GA (US); Sanjay M. Parekh, Duluth, GA (US)

(73) Assignee: Digital Envoy, Inc., Norcross, GA (US)

( * ) Notice: Subject to any disclaimer, the term of this patent is extended or adjusted under 35 U.S.C. 154(b) by 0 days.

(21) Appl. No.: 12/692,821

(22) Filed: Jan. 25, 2010

(65) Prior Publication Data

US 2010/0121953 A1    May 13, 2010

Related U.S. Application Data

(63) Continuation of application No. 10/106,523, filed on Mar. 25, 2002, now Pat. No. 7,685,311, which is a continuation-in-part of application No. 09/702,094, filed on Oct. 30, 2000, now Pat. No. 7,844,729, which is a continuation-in-part of application No. 09/632,959, filed on Aug. 4, 2000, now abandoned, which is a continuation-in-part of application No. 09/541,451, filed on Mar. 31, 2000, now Pat. No. 6,757,740.

(60) Provisional application No. 60/132,147, filed on May 3, 1999, provisional application No. 60/133,939, filed on May 13, 1999.

(51) Int. Cl.
*G06F 15/16* (2006.01)
*H04L 12/26* (2006.01)

(52) U.S. Cl. ........ 709/224; 709/225; 709/238; 709/242; 370/229; 370/232

(58) Field of Classification Search .......... 709/223–226, 709/238–242; 370/229–238
See application file for complete search history.

(56) References Cited

U.S. PATENT DOCUMENTS

| | | | |
|---|---|---|---|
| 4,939,723 A | 7/1990 | Harley, Jr. et al. | 370/84 |
| 4,939,726 A | 7/1990 | Flammer et al. | 370/400 |
| 5,042,027 A | 8/1991 | Takase | 370/252 |
| 5,042,032 A | 8/1991 | Dighe et al. | 370/231 |
| 5,115,433 A | 5/1992 | Baran et al. | 370/400 |
| 5,231,631 A | 7/1993 | Buhrke et al. | 370/230 |
| 5,291,550 A | 3/1994 | Levy et al. | 379/242 |
| 5,418,713 A | 5/1995 | Allen | 700/189 |
| 5,421,024 A | 5/1995 | Faulk, Jr. et al. | 709/223 |
| 5,459,863 A | 10/1995 | Taylor | 395/600 |

(Continued)

FOREIGN PATENT DOCUMENTS

AU    780066 B2    2/2005

(Continued)

OTHER PUBLICATIONS

DeBellis, Mathew A.; "Digital Envoy Greets $1.1 Million;" VC & Startups; http://www.redherring.com/vc/2000/0229/vc-digitalenvoy022900.html; Feb. 29, 2000; 3 pp.

(Continued)

*Primary Examiner* — Joshua Joo
(74) *Attorney, Agent, or Firm* — Ballard Spahr LLP

(57) ABSTRACT

A traffic reporter gathers real-time information on traffic conditions within a network and sends out traffic reports to traffic managers. The traffic reporter analyzes the network and also gathers network information from the traffic managers and analyzers dispersed throughout the network. These traffic reports provide real-time information on network conditions to allow the traffic managers to route network traffic in the most efficient, reliable, and fastest manner.

20 Claims, 23 Drawing Sheets

U.S. PATENT DOCUMENTS

| | | | |
|---|---|---|---|
| 5,488,608 A | 1/1996 | Flammer, III | 370/400 |
| 5,490,252 A | 2/1996 | Macera et al. | 709/249 |
| 5,493,689 A | 2/1996 | Waclawsky et al. | 710/1 |
| 5,636,276 A | 6/1997 | Brugger | 705/54 |
| 5,659,596 A | 8/1997 | Dunn | 455/456.1 |
| 5,680,390 A | 10/1997 | Robrock, II | 370/229 |
| 5,734,651 A | 3/1998 | Blakeley et al. | 370/392 |
| 5,734,823 A | 3/1998 | Saigh et al. | 709/229 |
| 5,734,891 A | 3/1998 | Saigh | 1/1 |
| 5,774,668 A | 6/1998 | Choquier et al. | 709/223 |
| 5,777,989 A | 7/1998 | McGarvey | 370/254 |
| 5,794,217 A | 8/1998 | Allen | 705/27 |
| 5,812,865 A | 9/1998 | Theimer et al. | 709/228 |
| 5,857,191 A | 1/1999 | Blackwell et al. | 707/10 |
| 5,862,339 A | 1/1999 | Bonnaure et al. | 395/200.57 |
| 5,870,561 A | 2/1999 | Jarvis et al. | 709/238 |
| 5,878,126 A | 3/1999 | Velamuri et al. | 379/219 |
| 5,913,036 A | 6/1999 | Brownmiller et al. | 709/224 |
| 5,920,697 A | 7/1999 | Masters et al. | 395/200.49 |
| 5,930,474 A | 7/1999 | Dunworth et al. | 709/217 |
| 5,937,163 A | 8/1999 | Lee et al. | 709/218 |
| 5,944,790 A | 8/1999 | Levy | 709/218 |
| 5,946,299 A | 8/1999 | Blonder | 370/237 |
| 5,948,061 A | 9/1999 | Merriman et al. | 709/219 |
| 5,958,052 A | 9/1999 | Bellovin et al. | 726/11 |
| 5,963,915 A | 10/1999 | Kirsch | 705/26 |
| 5,974,457 A | 10/1999 | Wachalwsky et al. | 709/224 |
| 5,978,845 A | 11/1999 | Reisacher | 709/223 |
| 5,987,523 A | 11/1999 | Hind et al. | 709/245 |
| 6,009,081 A | 12/1999 | Wheeler et al. | 370/255 |
| 6,012,052 A | 1/2000 | Altschuler et al. | 1/1 |
| 6,012,088 A | 1/2000 | Li et al. | 709/219 |
| 6,012,090 A | 1/2000 | Chung et al. | 709/219 |
| 6,014,634 A | 1/2000 | Scroggie et al. | 705/14.25 |
| 6,035,332 A | 3/2000 | Ingrassia, Jr. et al. | 709/224 |
| 6,058,420 A | 5/2000 | Davies | |
| 6,069,895 A | 5/2000 | Ayandeh | 370/399 |
| 6,069,939 A | 5/2000 | Fung et al. | 379/67.1 |
| 6,091,959 A | 7/2000 | Souissi et al. | 340/825.49 |
| 6,108,637 A | 8/2000 | Blumeanau | 705/7 |
| 6,115,754 A | 9/2000 | Landgren | 709/249 |
| 6,119,247 A | 9/2000 | House et al. | 714/38 |
| 6,128,664 A | 10/2000 | Yanagidate et al. | 709/228 |
| 6,130,890 A | 10/2000 | Leinwand et al. | 370/400 |
| 6,148,335 A | 11/2000 | Robinson et al. | 709/224 |
| 6,151,631 A | 11/2000 | Ansell et al. | 709/229 |
| 6,167,259 A | 12/2000 | Shah | 455/424 |
| 6,185,598 B1 | 2/2001 | Farber et al. | 709/200 |
| 6,192,312 B1 | 2/2001 | Hummelsheim | 701/118 |
| 6,243,746 B1 | 6/2001 | Sondur et al. | 709/220 |
| 6,243,749 B1 | 6/2001 | Sitaraman et al. | 709/223 |
| 6,249,252 B1 | 6/2001 | Dupray | 342/450 |
| 6,249,813 B1 | 6/2001 | Campion | 709/222 |
| 6,259,701 B1 | 7/2001 | Shur et al. | 370/401 |
| 6,266,607 B1 | 7/2001 | Meis et al. | 701/117 |
| 6,272,150 B1 | 8/2001 | Hrastar et al. | 370/486 |
| 6,272,343 B1 | 8/2001 | Pon et al. | 455/434 |
| 6,275,470 B1 | 8/2001 | Ricciulli | 370/238 |
| 6,285,660 B1 | 9/2001 | Ronen | 370/259 |
| 6,285,748 B1 | 9/2001 | Lewis | 379/112.01 |
| 6,286,047 B1 | 9/2001 | Ramanathan et al. | 709/224 |
| 6,317,761 B1 | 11/2001 | Landsman et al. | 715/205 |
| 6,324,585 B1 | 11/2001 | Zhang et al. | 709/245 |
| 6,327,677 B1 * | 12/2001 | Garg et al. | 714/37 |
| 6,330,239 B1 | 12/2001 | Suzuki | 370/395 |
| 6,332,127 B1 | 12/2001 | Bandera et al. | |
| 6,332,158 B1 | 12/2001 | Risley et al. | 709/219 |
| 6,338,082 B1 | 1/2002 | Schneider | 709/203 |
| 6,343,290 B1 | 1/2002 | Cossins et al. | 707/10 |
| 6,345,303 B1 | 2/2002 | Knauerhase et al. | 709/238 |
| 6,347,078 B1 | 2/2002 | Narvaez-Guarnieri | 370/230 |
| 6,356,761 B1 | 3/2002 | Huttunen | 455/456 |
| 6,356,929 B1 | 3/2002 | Gall et al. | 709/201 |
| 6,374,302 B1 | 4/2002 | Galasso et al. | 709/238 |
| 6,397,246 B1 | 5/2002 | Wolfe | 709/217 |
| 6,415,323 B1 | 7/2002 | McCanne et al. | 709/225 |
| 6,421,726 B1 | 7/2002 | Kenner et al. | 709/225 |
| 6,425,000 B1 | 7/2002 | Carmello et al. | 709/217 |
| 6,442,565 B1 | 8/2002 | Tyra et al. | 1/1 |
| 6,446,076 B1 | 9/2002 | Burkey et al. | 707/102 |
| 6,466,940 B1 | 10/2002 | Mills | 1/1 |
| 6,473,407 B1 | 10/2002 | Ditmer et al. | 370/252 |
| 6,477,150 B1 | 11/2002 | Maggenti et al. | 370/312 |
| 6,484,143 B1 | 11/2002 | Swildens et al. | 705/1.1 |
| 6,487,538 B1 | 11/2002 | Gupta et al. | 705/14.66 |
| 6,498,782 B1 | 12/2002 | Branstad et al. | |
| 6,505,201 B1 | 1/2003 | Haitsuka et al. | 1/1 |
| 6,505,254 B1 | 1/2003 | Johnson et al. | 709/239 |
| 6,505,255 B1 | 1/2003 | Akatsu et al. | 709/239 |
| 6,513,061 B1 | 1/2003 | Ebata et al. | 709/203 |
| 6,516,192 B1 | 2/2003 | Spaur et al. | 455/450 |
| 6,526,450 B1 | 2/2003 | Zhang et al. | 709/245 |
| 6,529,475 B1 | 3/2003 | Wan | 370/231 |
| 6,529,491 B1 | 3/2003 | Chang et al. | 370/335 |
| 6,542,739 B1 | 4/2003 | Garner | 455/427 |
| 6,570,974 B1 | 5/2003 | Gerszberg et al. | 379/218.01 |
| 6,571,279 B1 | 5/2003 | Herz et al. | 709/217 |
| 6,574,663 B1 | 6/2003 | Bakshi et al. | 709/223 |
| 6,577,653 B1 | 6/2003 | Rochberger et al. | 370/536 |
| 6,578,066 B1 | 6/2003 | Logan et al. | 718/105 |
| 6,597,777 B1 | 7/2003 | Ho | |
| 6,611,873 B1 | 8/2003 | Kanehara | 709/238 |
| 6,629,136 B1 | 9/2003 | Naidoo | 709/219 |
| 6,643,696 B2 | 11/2003 | Davis et al. | 709/224 |
| 6,665,715 B1 | 12/2003 | Houri | 709/223 |
| 6,684,250 B2 | 1/2004 | Anderson et al. | 709/225 |
| 6,721,795 B1 | 4/2004 | Eldreth | 709/233 |
| 6,757,740 B1 | 6/2004 | Parekh et al. | 709/245 |
| 6,778,524 B1 | 8/2004 | Augart | 370/351 |
| 6,826,617 B1 | 11/2004 | Ansell et al. | 709/229 |
| 6,836,476 B1 | 12/2004 | Dunn | 370/352 |
| 6,968,394 B1 | 11/2005 | El-Rafie | 709/245 |
| 6,973,039 B2 | 12/2005 | Redi et al. | 370/238 |
| 6,996,084 B2 | 2/2006 | Troxel et al. | 370/338 |
| 7,039,689 B2 | 5/2006 | Martija et al. | 709/220 |
| 7,062,572 B1 | 6/2006 | Hampton | 709/245 |
| 7,072,963 B2 | 7/2006 | Anderson et al. | 709/225 |
| 7,116,643 B2 | 10/2006 | Huang et al. | 370/255 |
| 7,139,820 B1 | 11/2006 | O'Toole et al. | 709/223 |
| 7,200,673 B1 | 4/2007 | Augart | 709/238 |
| 7,260,085 B2 | 8/2007 | Dobbins et al. | 370/352 |
| 7,269,157 B2 * | 9/2007 | Klinker et al. | 370/351 |
| 7,296,088 B1 | 11/2007 | Padmanabhan et al. | |
| 7,298,327 B2 | 11/2007 | Dupray et al. | 342/451 |
| 7,403,978 B2 | 7/2008 | Parekh et al. | 709/217 |
| 7,451,233 B2 | 11/2008 | Parekh et al. | 709/245 |
| 7,454,523 B2 | 11/2008 | Chow et al. | 709/245 |
| 7,685,311 B2 | 3/2010 | Friedman et al. | 709/245 |
| 7,698,377 B2 | 4/2010 | Parekh et al. | 709/217 |
| 2001/0020242 A1 | 9/2001 | Gupta et al. | 707/501.1 |
| 2002/0007374 A1 | 1/2002 | Marks et al. | 709/203 |
| 2002/0042274 A1 | 4/2002 | Ades | 455/445 |
| 2002/0131363 A1 * | 9/2002 | Beshai et al. | 370/230 |
| 2002/0143991 A1 | 10/2002 | Chow et al. | 709/245 |
| 2002/0152311 A1 | 10/2002 | Veltman et al. | 709/227 |
| 2002/0165980 A1 * | 11/2002 | Brown | 709/242 |
| 2003/0065571 A1 | 4/2003 | Dutta | 705/26 |
| 2003/0086422 A1 | 5/2003 | Klinker et al. | 370/389 |
| 2003/0090996 A1 | 5/2003 | Stewart | 370/225 |
| 2003/0110293 A1 | 6/2003 | Friedman | 709/245 |
| 2004/0078489 A1 | 4/2004 | Anderson et al. | 709/245 |
| 2004/0078490 A1 | 4/2004 | Anderson et al. | 709/245 |
| 2004/0151129 A1 | 8/2004 | Kun-Szabo et al. | 370/254 |
| 2004/0199623 A1 | 10/2004 | Houri | 709/223 |
| 2005/0021853 A1 | 1/2005 | Parekh et al. | |
| 2005/0041675 A1 | 2/2005 | Trostle et al. | 370/401 |
| 2005/0190695 A1 * | 9/2005 | Phaal | 370/229 |
| 2005/0234922 A1 | 10/2005 | Parekh | 707/10 |
| 2005/0251539 A1 | 11/2005 | Parekh | 707/200 |
| 2005/0271038 A1 * | 12/2005 | Xin et al. | 370/351 |
| 2006/0146820 A1 | 7/2006 | Friedman | 370/390 |
| 2006/0212601 A1 | 9/2006 | Hampton | 709/245 |
| 2006/0224752 A1 | 10/2006 | Parekh | 709/230 |
| 2008/0037536 A1 | 2/2008 | Padmanabhan et al. | 370/389 |
| 2008/0123558 A1 | 5/2008 | Chhabra | 370/254 |
| 2008/0275978 A1 | 11/2008 | Houri | 709/223 |
| 2009/0112703 A1 | 4/2009 | Brown | 705/10 |

| | | | |
|---|---|---|---|
| 2010/0153525 A1 | 6/2010 | Parekh et al. | 709/221 |
| 2010/0153552 A1 | 6/2010 | Parekh et al. | 709/225 |
| 2010/0211960 A1 | 8/2010 | Sirajuddin et al. | |

FOREIGN PATENT DOCUMENTS

| | | |
|---|---|---|
| CA | 2372808 A1 | 11/2000 |
| EP | 1 037 447 | 9/2000 |
| EP | 1175767 A1 | 1/2002 |
| EP | 02794011.3 | 6/2005 |
| JP | 08-044638 | 2/1996 |
| JP | 09-284341 | 10/1997 |
| JP | 11-032080 A | 2/1999 |
| JP | 3254422 | 1/2000 |
| JP | 2000201147 A | 7/2000 |
| WO | WO-96/13108 A2 | 5/1996 |
| WO | WO-99/34305 A1 | 7/1999 |
| WO | WO-00/22495 A2 | 4/2000 |
| WO | WO-00/67450 A1 | 11/2000 |
| WO | WO-0067450 A1 | 11/2000 |
| WO | WO-01/22656 A2 | 3/2001 |
| WO | WO-01/57696 A1 | 8/2001 |
| WO | WO 01/75632 | 10/2001 |
| WO | WO 01/75698 | 10/2001 |
| WO | WO 02/13459 | 2/2002 |
| WO | WO 02/17139 A1 | 2/2002 |
| WO | WO-02/23807 A2 | 3/2002 |
| WO | WO 03/084159 | 10/2003 |

OTHER PUBLICATIONS

Digital Element, "Digital Element Brings a New 'Edge' to Global Online Targeting," Press Release of Jul. 28, 2009. Available at http://www.digitalelement.com/press_room/re_072809.html.
Digital Element, "NetAcuity Edge, A digital Element Product Sheet," Jul. 28, 2009.
Digital Element, "NetAcuity Edge, A New 'Edge' for Global Online Targeting," Jul. 28, 2009. Available at http://www.digitalelement.com/our_technology/edge.html.
Digital Island; "TraceWare White Paper;" Digital Island San Francisco, CA 64105 USA; Jun. 1999 (8 pp.).
Eastlake, "Domain Name System Security Extensions", Internet Engineering Task Force, Request for Comments 2535, 1999.
Gargano et al., RFC: 1834, "Whois and Network Information Lookup Service," Aug. 1995.
Harrenstien, "Nicname/Whois", Internet Engineering Task Force, Request for Comments 954, 1985.
Imielinski, Tomasz, et al., "Geographic Addressing, Routing, and Resource Discovery with the Global Positioning System," Computer Science Dept. Rutgers, The State University, Piscataway, NJ 08855; Oct. 19, 1996; pp. 1-10.
Kessler & Sheppard; "A primer on Internet and TCP/IP Tools and Utilities;" Network Working Group; Request for Comments: 2151; FYI: 30; Obsoletes: RFC 1739; Category: Informational; http:www.ietff.org/rfc/rfc2151.txt; Jun. 1997; (pp. 1-46).
Lambert, John; "Subnet Masking Definition;" www.exabyte.net/lambert/subnet/subnet_masking_definition.htm; 1999.
McCurley, Kevin S. "Geospacial Mapping and Navigation of the Web"; IBM Almaden Research Center; San Jose, CA 95120; May 1-5, 2001; pp. 221-229.
Roussea, Jean-Marc; Roy, Serge, "GeoRoute: An Interactive Graphics System for Routing and Scheduling Over Street Networks," IEEE Sep. 1989; pp. 161-163.
Woolley, S, "We Know Where You Live", Forbes Magazine, Nov. 13, 2000.
Padmanabhan et al: "An Investigation of Geographic Mapping Techniques for Internet Hosts",Computer Communication Review, ACM, New York, NY, US, vol. 31, No. 4, Oct. 1, 2001, Chapter 6: pp. 173-185.
Moore et al: "Where in the World is netgeo.caida.org?" Internet Citation, [Online] XP002192522 Retrieved from the Internet: URL: http://www.caida.org/outreach/papers/2000/inetnetgeo/inetnetgeo.html> [originally retrieved on Mar. 8, 2003; re-retrieved May 27, 2011].
Shiode et al: "Analysing the Geography of Internet Address Space" Internet Citation, [Online] Retrieved from the Internet: URL: http://geog.ucl.uk/casa/martine/internetspace.html> [retrieved on Feb. 16, 2004].
Buyukkokten et al: "Exploiting Geographical Location Information of Web Pages", Department of Computer Science, Stanford University, Stanford, CA 94305: (1999).
Digital Island, "Content Delivery Services: Footprint Streaming Solutions", Product Brochure. Digital Island, San Francisco, CA 64105: [Retrieved on Feb. 16, 2004].
Lamm et al. "Real-time geographic visualization of World Wide Web traffic". *Comput. Netw. ISDN Syst.* 28, 7-11 (May 1996), 1457-1468.
Cooney, Ron. "Subnet Addressing". Unix World. Internet Citation, [Online] Retrieved from the Internet: URL: http://www.networkcomputing.com/unixworld/tutorial/001.html> [retrieved on Feb. 16, 2004].
U.S. Appl. No. 09/702,094, Friedman, filed Oct. 30, 2000, Issue Notification, Date of Document Nov. 10, 2010.
U.S. Appl. No. 09/702,094, Friedman, filed Oct. 30, 2000, Supplemental Notice of Allowance, Date of Document Oct. 15, 2010.
U.S. Appl. No. 09/702,094, Friedman, filed Oct. 30, 2000, Supplemental Notice of Allowance, Date of Document Sep. 24, 2010.
U.S. Appl. No. 09/702,094, Friedman, filed Oct. 30, 2000, Notice of Allowance, Date of Document Sep. 2, 2010.
U.S. Appl. No. 12/709,652, Parekh, filed Feb. 22, 2010, Response after Non-Final Rejection, Date of Document Jun. 15, 2011.
U.S. Appl. No. 12/709,656, Parekh, filed Feb. 22, 2010, Response after Non-Final Rejection, Date of Document Jun. 10, 2011.
Response to Non-Final Office Action filed on Jun. 30, 2011 for U.S. Appl. No. 12/616,366, filed on Sep. 11, 2009 (First Named Inventor: J. Burdette).
Final Office Action issued on Sep. 1, 2011 for U.S. Appl. No. 12/709,652, filed on Feb. 22, 2010 (First Named Inventor: S. Parekh).
Final Office Action issued on Sep. 15, 2011 for U.S. Appl. No. 12/709,656, filed on Feb. 22, 2010 (First Named Inventor: S. Parekh).

* cited by examiner

GEO-INTELLIGENT TRAFFIC REPORTER

CROSS-REFERENCE TO RELATED APPLICATIONS

This application is a continuation of, and incorporates by reference, U.S. application Ser. No. 10/106,523, entitled "Geo-Intelligent Traffic Reporter," filed Mar. 25, 2002 now U.S. Pat. No. 7,685,311, which is a continuation-in-part of U.S. application Ser. No. 09/702,094, entitled "Geo-Intelligent Traffic Manager," filed Oct. 30, 2000 now U.S. Pat. No. 7,844,729, which is a continuation-in-part of U.S. application Ser. No. 09/632,959 entitled "Determining Geographic Locations of Private Network Internet Users," filed on Aug. 4, 2000 now abandoned, which is a continuation-in-part of U.S. application Ser. No. 09/541,451 entitled "Systems and Methods for Determining, Collecting, and Using Geographic Locations of Internet Users," filed on Mar. 31, 2000 now U.S. Pat. No. 6,757,740, which claims priority to, and incorporates by reference, U.S. Application Ser. No. 60/132,147 entitled "System to Determine the Geographic Location of an Internet User" filed on May 3, 1999, and U.S. Application Ser. No. 60/133,939 entitled "Method, System and Set of Programs for Tailoring an Internet Site Based Upon the Geographic Location or Internet Connection Speed of Internet User" filed on May 13, 1999.

FIELD OF THE INVENTION

The present invention relates to systems and methods for routing Internet traffic and, more particularly, to systems and methods for providing real-time information on Internet traffic, such as information on geographical location of nodes and links, distances, available bandwidth at nodes, connection speeds, available resources, and status of nodes or links.

BACKGROUND

The Internet consists of a network of interconnected computer networks. Each of these computers has an IP address that is comprised of a series of four numbers separated by periods or dots and each of these four numbers is an 8-bit integer which collectively represent the unique address of the computer within the Internet. The Internet is a packet switching network whereby a data file routed over the Internet to some destination is broken down into a number of packets that are separately transmitted to the destination. Each packet contains, inter alia, some portion of the data file and the IP address of the destination.

The IP address of a destination is useful in routing packets to the correct destination but is not very people friendly. A group of four 8-bit numbers by themselves do not reveal or suggest anything about the destination and most people would find it difficult to remember the IP addresses of a destination. As a result of this shortcoming in just using IP addresses, domain names were created. Domain names consist of two or more parts, frequently words, separated by periods. Since the words, numbers, or other symbols forming a domain name often indicate or at least suggest the identity of a destination, domain names have become the standard way of entering an address and are more easily remembered than the IP addresses. After a domain name has been entered, a domain name server (DNS) resolves the domain name into a specific IP address. Thus, for example, when someone surfing the Internet enters into a browser program a particular domain name for a web site, the browser first queries the DNS to arrive at the proper IP address.

While the IP address works well to deliver packets to the correct address on the Internet, IP addresses do not convey any useful information about the geographic address of the destination. Furthermore, the domain names do not even necessarily indicate any geographic location although sometimes they may suggest, correctly or incorrectly, such a location. This absence of a link between the IP address or domain name and the geographic location holds true both nationally and internationally. For instance, a country top-level domain format designates .us for the United States, .uk for the United Kingdom, etc. Thus, by referencing these extensions, at least the country within which the computer is located can often be determined. These extensions, however, can often be deceiving and may be inaccurate. For instance, the .md domain is assigned to the Republic of Moldova but has become quite popular with medical doctors in the United States. Consequently, while the domain name may suggest some aspect of the computer's geographic location, the domain name and the IP address often do not convey any useful geographic information.

In addition to the geographic location, the IP address and domain name also tell very little information about the person or company using the computer or computer network. Consequently, it is therefore possible for visitors to go to a web site, transfer files, or send email without revealing their true identity. This anonymity, however, runs counter to the desires of many web sites. For example, for advertising purposes, it is desirable to target each advertisement to a select market group optimized for the goods or services associated with the advertisement. An advertisement for a product or service that matches or is closely associated with the interests of a person or group will be much more effective, and thus more valuable to the advertisers, than an advertisement that is blindly sent out to every visitor to the site.

Driven often by the desire to increase advertising revenues and to increase sales, many sites are now profiling their visitors. To profile a visitor, web sites first monitor their visitors' traffic historically through the site and detect patterns of behavior for different groups of visitors. The web site may come to infer that a certain group of visitors requesting a page or sequence of pages has a particular interest. When selecting an advertisement for the next page requested by an individual in that group, the web site can target an advertisement associated with the inferred interest of the individual or group. Thus, the visitor's traffic through the web site is mapped and analyzed based on the behavior of other visitors at the web site. Many web sites are therefore interested in learning as much as possible about their visitors in order to increase the profitability of their web site.

The desire to learn more about users of the Internet is countered by privacy concerns of the users. The use of cookies, for instance, is objectionable to many visitors. In fact, bills have been introduced into the House of Representatives and also in the Senate controlling the use of cookies or digital ID tags. By placing cookies on a user's computer, companies can track visitors across numerous web sites, thereby suggesting interests of the visitors. While many companies may find cookies and other profiling techniques beneficial, profiling techniques have not won wide-spread approval from the public at large.

A particularly telling example of the competing interests between privacy and profiling is when Double Click, Inc. of New York, N.Y. tied the names and addresses of individuals to their respective IP addresses. The reactions to Double Click's actions included the filing of a complaint with the Federal Trade Commission (FTC) by the Electronic Privacy Information Center and outbursts from many privacy advocates that the tracking of browsing habits of visitors is inherently invasive. Thus, even though the technology may allow for precise tracking of individuals on the Internet, companies must carefully balance the desire to profile visitors with the rights of the visitors in remaining anonymous.

The difficulty in learning more about Internet users is further complicated when the Internet users are part of a private network, such as America On-Line (AOL). AOL and other private networks act as an intermediary by operating a proxy server between its member users and the Internet. The proxy server helps to create a private community of members and also insulates and protects the members from some invasive inquiries that can occur over the Internet. As part of this protection and insulation, many of these private networks assign its members a first set of IP addresses for routing only within the private network and do not reveal these IP addresses to entities outside of the private network, such as over the Internet. To communicate with the members, entities outside of the private network do not have direct access to the members but instead must go through the proxy servers. As should be apparent to those skilled in the art, profiling and otherwise gathering information on members of private networks can be made even more difficult due to the proxy servers.

In addition to learning more about Internet users for the purposes of targeting content to the user, knowledge of the user and of the destination can also be helpful in routing the user's request. With the Internet, user requests are broken down into packets and these packets are routed from node to node until the packets finally reach the intended destination. These packets are then reassembled to form the original request. During transit, the packets may take different routes and some of the packets may be dropped. The nodes typically try to send the packets to the destination by traversing the smallest number of nodes or hops. Each node has some latency time in sending off packets after it receives the packets, so by minimizing the number of hops the latency time is minimized. With knowledge of where the destination is located, the nodes can choose a more direct route, even if it has a greater number of hops.

U.S. Pat. No. 6,130,890 to Leinwand et al., which is incorporated herein by reference, describes a method and system for optimizing the routing of data packets. This patent explains that many of the international links between countries are often highly overloaded and that using these links can result in longer delays, even though it may have the fewest number of hops. The method described in this patent involves using information maintained on each AS, such as through the American Registry for Internet Numbers ("ARIN"), the Reseaux IP Europeans ("RIPE"), and the Asia-Pacific Network Information Center ("APNIC"). By querying the organizations, the system can obtain country information on each Autonomous System (AS) and map the ASs with their country designations. The packets can then be routed by selecting a direct link to the country associated with the destination.

The systems and methods disclosed in Leinwand et al. provide limited success in optimizing the routing of Internet traffic. As explained above, the Leinwand et al. patent describes country level routing of Internet traffic but does not explain how routing may be performed within one country. Since much of the Internet traffic originating in the United States is to a destination in the United States, the method and system described in the Leinwand et al. patent would be of only little benefit. Further, the information associated with AS numbers does not accurately identify the geographic location of an AS. The country information may list the AS in a different country than where it is really located and, as explained in the patent, may list an AS with more than one country. In addition to not always being accurate, the reliance on the AS information possibly may not be useful for the long term. The space reserved for the AS numbers are rapidly being depleted with the explosive growth of the Internet. If the AS numbers do become depleted, then it may not be possible to determine the geographic location of a later deployed AS with the methods described in this patent.

A need therefore exists for improved systems and methods for more efficiently and effectively routing Internet traffic.

SUMMARY

The invention addresses the problems above by providing systems and methods for routing network traffic based on geographic location information. According to one aspect of the invention, the methods involves receiving network traffic and directing the network traffic based on intelligence on the network. The intelligence includes data that allows the traffic manager to efficiently and effectively route the network traffic. The intelligence includes, but is not limited to, the geographic location of the destination for the traffic, the geographic location for a source of the traffic, bandwidth available at the source, destination, or intermediate nodes, connection speeds of links between nodes or connection speed at the source, loads at different destinations, and reliability of network elements. In the preferred embodiment, a set of analyzers are distributed throughout the network and gather the intelligence. Alternatively, the intelligence can be gathered directly from the network or from another system.

A traffic manager according to the preferred embodiment stores the intelligence in a map of the network. The map is populated with geographic information on the source and the destination by determining a route through the network to destination or source. A method of the invention involves deriving a geographic location of any intermediate hosts contained within the route between the source and destination, analyzing the route and the geographic locations of any intermediate hosts, and then determining the geographic locations of the source and destination. After this geographic information is ascertained, the geographic information is stored in the map.

The preferred system according to the invention performs a whois to determine the organization that owns an IP address or domain name. The address of the owner provides some suggestion of the geographic location, but is not determinative. The system does a traceroute to obtain the route to the destination and maps the route geographically in a database. A confidence level is assigned to the geographic location based on knowledge of hosts or nodes along the route. The system may also take into account the top-level domain and the actual words in the domain name. The traffic manager may be used in anywhere in the network, such as part of a DNS service to forward a user's request to a desired IP address or as a http redirect to a desired content server at a site.

According to another aspect, the systems and methods relate to a traffic reporter that acquires real-time information on the network and traffic conditions. The traffic reporter sends traffic reports to the traffic managers, which are dispersed throughout the network. The traffic managers use this real-time information in providing routing information to a particular destination. The traffic reporter performs an analysis of the network in order to obtain this information and receives the information from other sources as well, such as through the traffic managers themselves or through the analyzers. The traffic reporter uses some discretion in providing these traffic reports to the traffic managers so that the traffic managers only receive updates or reports upon the occurrence of significant changes in the traffic conditions.

The traffic managers receive the traffic reports from the traffic reporter and provide routing directions based on these traffic reports. The traffic managers maintain a database of normal traffic conditions and also monitor any traffic reports generated by the traffic reporter. In determining routing directions, the traffic managers use the database of normal traffic conditions as the default set of data but also check any relevant traffic reports before arriving at the optimal routing directions. The traffic managers also monitor local traffic conditions and determine when these conditions depart from the normal conditions to such an extent that the traffic manager should report the occurrence to the traffic reporter. The traffic managers therefore assist the traffic reporter in maintaining the most up-to-date and accurate information on the network, including information on the traffic conditions.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

I. Collecting, Determining and Distributing Geographic Locations

According to one aspect, the present invention relates to systems and methods of collecting, determining, and distributing data that identifies where an Internet user is likely to be geographically located. Because the method of addressing on the Internet, Internet Protocol (IP) addresses, allows for any range of addresses to be located anywhere in the world, determining the actual location of any given machine, or host, is not a simple task.

A. Collecting Geographic Location Data

Figure 1:
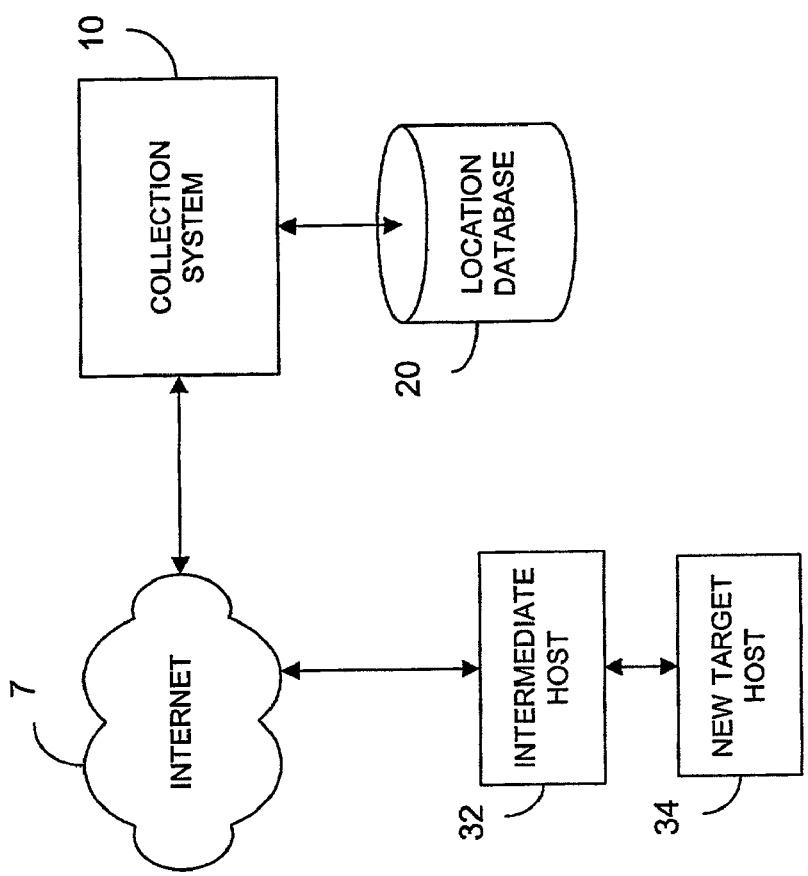
FIG. 1 is a block diagram of a network having a collection system according to a preferred embodiment of the invention.

A system 10 for collecting geographic information is shown in FIG. 1. The system 10 uses various Internet route tools to aid in discovering the likely placement of newly discovered Internet hosts, such as new target host 34. In particular the system 10 preferably uses programs known as host, nslookup, ping, traceroute, and whois in determining a geographic location for the target host 34. It should be understood that the invention is not limited to these programs but may use other programs or systems that offer the same or similar functionality. Thus, the invention may use any systems or methods to determine the geographic location or provide further information that will help ascertain the geographic location of an IP address.

In particular, nslookup, ping, traceroute, and whois provide the best source of information. The operation of ping and traceroute is explained in the Internet Engineering Task Force (IETF) Request For Comments (RFC) numbered 2151, nslookup (actually DNS lookups) is explained in the IETF RFC numbered 2535, and whois is explained in the IETF RFC numbered 954. A brief explanation of each of host, nslookup, ping, traceroute, and whois is given below. In explaining the operation of these commands, source host refers to the machine that the system 10 is run on and target host refers to the machine being searched for by the system 10, such as target host 34. A more detailed explanation of these commands is available via the RFCs specified or manual pages on a UNIX system.

host queries a target domain's DNS servers and collects information about the domain name. For example, with the "-l" option the command "host -l digitalenvoy.net" will show the system 10 all host names that have the suffix of digitalenvoy.net.

nslookup will convert an IP address to a host name or vice versa using the DNS lookup system.

ping sends a target host a request to see if the host is on-line and operational. ping can also be used to record the route that was taken to query the status of the target host but this is often not completely reliable.

traceroute is designed to determine the exact route that is taken to reach a target host. It is possible to use traceroute to determine a partial route to a non-existent or non-online target host machine. In this case the route will be traced to a certain point after which it will fail to record further progress towards the target host. The report that is provided to the system 10 by traceroute gives the IP address of each host encountered from the source host to the target host. traceroute can also provide host names for each host encountered using DNS if it is configured in this fashion.

whois queries servers on the Internet and can obtain registration information for a domain name or block of IP addresses.

Figure 2:
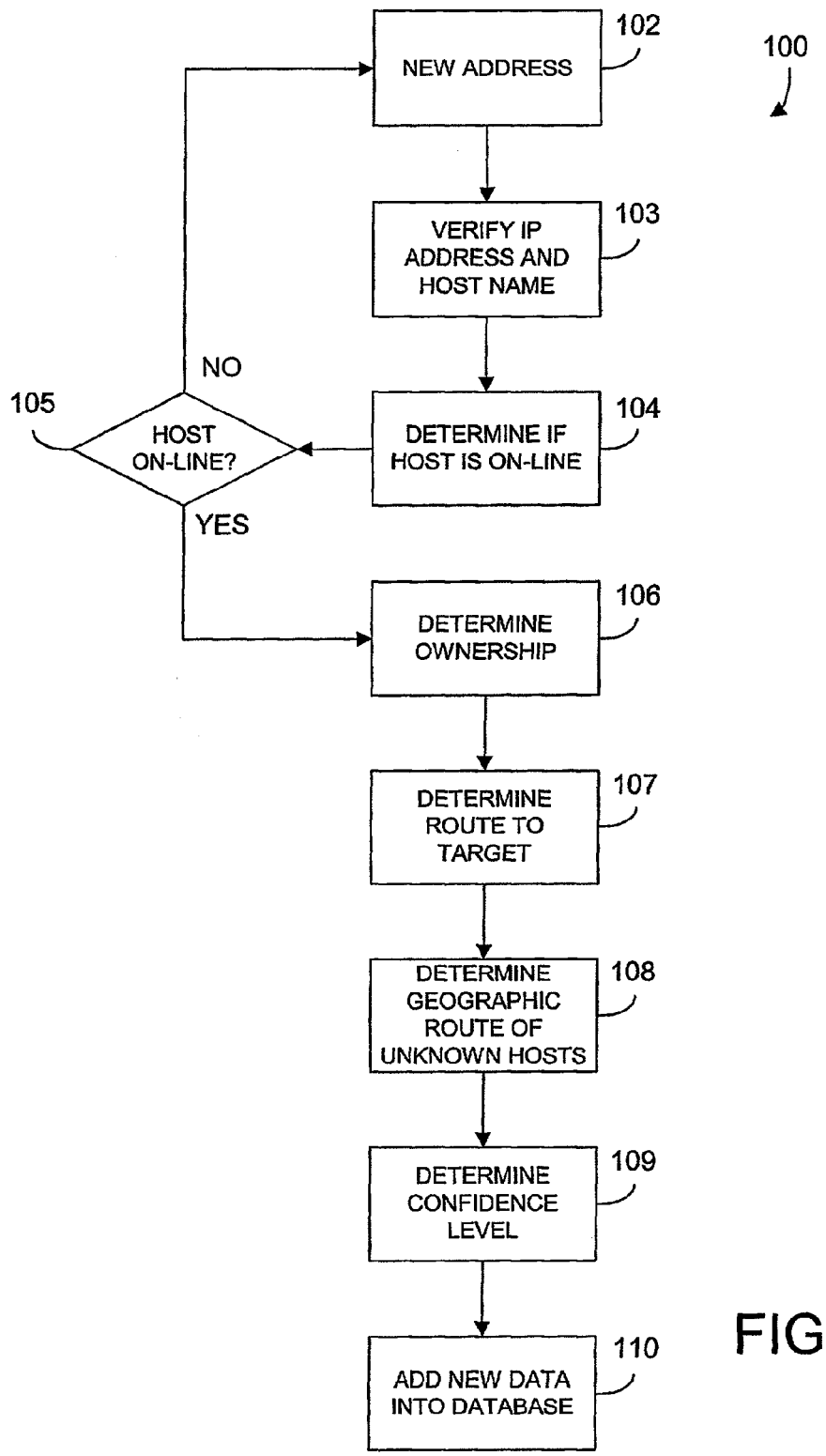
FIG. 2 is a flow chart depicting a preferred method of operation for the collection system of FIG. 1.

A preferred method 100 of operation for the system 10 will now be described with reference to FIGS. 1 and 2. At 102, the system 10 receives a new address for which a geographic location is desired. The system 10 accepts new target hosts that are currently not contained in its database 20 or that need to be re-verified. The system 10 requires only one of the IP address or the host name, although both can be provided. At 103, the system 10 preferably, although not necessarily, verifies the IP address and host name. The system 10 uses nslookup to obtain the host name or IP address to verify that both pieces of information are correct. Next, at 104, the system 10 determines if the target host 34 is on-line and operational and preferably accomplishes this function through a ping. If the host 34 is not on-line, the system 10 can re-queue the IP address for later analysis, depending upon the preferences in the configuration of the system 10.

At 106, the system 10 determines ownership of the domain name. Preferably, the system 10 uses a whois to determine the organization that actually owns the IP address. The address of this organization is not necessarily the location of the IP address but this information may be useful for smaller organizations whose IP blocks are often geographically in one location. At 107, the system 10 then determines the route taken to reach the target host 34. Preferably, the system 10 uses a traceroute on the target host 34. At 108, the system 10 takes the route to the target host 34 and analyzes and maps it geographically against a database 20 of stored locations. If any hosts leading to the target host, such as intermediate host 32, are not contained in the database 20, the system 10 makes a determination as to the location of those hosts.

At 109, a determination is then made as to the location of the target host and a confidence level, from 0 to 100, is assigned to the determination based on the confidence level of hosts leading to and new hosts found and the target host 34. All new hosts and their respective geographic locations are then added to the database 20 at 110.

If the host name is of the country top-level domain format (.us, .uk, etc.) then the system 10 first maps against the country and possibly the state, or province, and city of origin. The system 10, however, must still map the Internet route for the IP address in case the address does not originate from where the domain shows that it appears to originate. As discussed in the example above, the .md domain is assigned to the Republic of Moldova but is quite popular with medical doctors in the United States. Thus, the system 10 cannot rely completely upon the country top-level domain formats in determining the geographic location.

The method 100 allows the system 10 to determine the country, state, and city that the target host 34 originates from and allows for an assignment of a confidence level against entries in the database. The confidence level is assigned in the following manner. In cases where a dialer has been used to determine the IP address space assigned by an Internet Service Provider to a dial-up modem pool, which will be described in more detail below, the confidence entered is 100. Other confidences are based upon the neighboring entries. If two same location entries surround an unknown entry, the unknown entry is given a confidence of the average of the known same location entries. For instance, a location determined solely by whois might receive a 35 confidence level.

As an example, a sample search against the host "digitalenvoy.net" will now be described. First, the system 10 receives the target host "digitalenvoy.net" at 102 and does a DNS lookup on the name at 103. The command nslookup returns the following to the system 10:

```
> nslookup digitalenvoy.net
Name:      digitalenvoy.net
Address:   209.153.199.15
```

The system 10 at 104 then does a ping on the machine, which tells the system 10 if the target host 34 is on-line and operational. The "−c 1" option tells ping to only send one packet. This option speeds up confirmation considerably. The ping returns the following to the system 10:

```
> ping -c 1 digitalenvoy.net
PING digitalenvoy.net (209.153.199.15): 56 data bytes
64 bytes from 209.153.199.15: icmp_seq=0 ttl=241 time=120.4 ms
--- digitalenvoy.net ping statistics ---
1 packets transmitted, 1 packets received, 0% packet loss
round-trip min/avg/max = 120.4/120.4/120.4 ms
```

The system 10 next executes a whois at 106 on "digitalenvoy.net". In this example, the whois informs the system 10 that the registrant is in Georgia.

```
> whois digitalenvoy.net
Registrant:
Some One (DIGITALENVOY-DOM)
    1234 Address Street
    ATLANTA, GA 33333
    US
    Domain Name: DIGITALENVOY.NET
    Administrative Contact:
        One, Some (SO0000) some@one.net
        +1 404 555 5555
    Technical Contact, Zone Contact:
        myDNS Support (MS311-ORG) support@MYDNS.COM
        +1 (206) 374.2143
    Billing Contact:
        One, Some (SO0000) some@one.net
        +1 404 555 5555
    Record last updated on 14-Apr-99.
    Record created on 14-Apr-99.
    Database last updated on 22-Apr-99 11:06:22 EDT.
    Domain servers in listed order:
    NS1.MYDOMAIN.COM            209.153.199.2
    NS2.MYDOMAIN.COM            209.153.199.3
    NS3.MYDOMAIN.COM            209.153.199.4
    NS4.MYDOMAIN.COM            209.153.199.5
```

The system 10 at 107 executes a traceroute on the target host 34. The traceroute on "digitalenvoy.net" returns the following to the system 10:

```
> traceroute digitalenvoy.net
traceroute to digitalenvoy.net (209.153.199.15), 30 hops max, 40
byte packets
    1 130.207.47.1 (130.207.47.1) 6.269 ms 2.287 ms 4.027 ms
    2 gateway1-rtr.gatech.edu (130.207.244.1) 1.703 ms 1.672 ms
```

-continued 1.928 ms
   3 fl-0.atlanta2-cr99.bbnplanet.net (192.221.26.2) 3.296 ms
3.051 ms 2.910 ms
   4 fl-0.atlanta2-br2.bbnplanet.net (4.0.2.90) 3.000 ms 3.617 ms
3.632 ms
   5 s4-0-0.atlanta1-br2.bbnplanet.net (4.0.1.149) 4.076 ms
s8-1-0.atlanta1-br2.bbnplanet.net (4.0.2.157) 4.761 ms 4.740 ms
   6 h5-1-0.paloalto-br2.bbnplanet.net (4.0.3.142) 72.385 ms
71.635 ms 69.482 ms
   7 p2-0.paloalto-nbr2.bbnplanet.net (4.0.2.197) 82.580 ms
83.476 ms 82.987 ms
   8 p4-0.sanjose1-nbr1.bbnplanet.net (4.0.1.2) 79.299 ms 78.139 ms
80.416 ms
   9 p1-0-0.sanjose1-br2.bbnplanet.net (4.0.1.82) 78.918 ms
78.406 ms 79.217 ms
   10 NSanjose-core0.nap.net (207.112.242.253) 80.031 ms 78.506 ms
122.622 ms
   11 NSeattle1-core0.nap.net (207.112.247.138) 115.104 ms 112.868 ms
114.678 ms
   12 sea-atm0.starcom-accesspoint.net (207.112.243.254) 112.639 ms
327.223 ms 173.847 ms
   13 van-atm10.10.starcom.net (209.153.195.49) 118.899 ms 116.603 ms
114.036 ms
   14 hume.worldway.net (209.153.199.15) 118.098 ms * 114.571 ms After referring to the geographic locations stored in the database 20, the system 10 analyzes these hops in the following way:

| | |
|---|---|
| 130.207.47.1 (130.207.47.1) | Host machine located in Atlanta, GA |
| gateway1-rtr.gatech.edu (130.207.244.1) | Atlanta, GA - confidence 100 |
| f1-0.atlanta2-cr99.bbnplanet.net (192.221.26.2) | Atlanta, GA - confidence 100 |
| f1-0.atlanta2-br2.bbnplanet.net (4.0.2.90) | Atlanta, GA - confidence 95 |
| s4-0-0.atlanta1-br2.bbnplanet.net (4.0.1.149) | Atlanta, GA - confidence 80 |
| h5-1-0.paloalto-br2.bbnplanet.net (4.0.3.142) | Palo Alto, CA - confidence 85 |
| p2-0.paloalto-nbr2.bbnplanet.net (4.0.2.197) | Palo Alto, CA - confidence 90 |
| p4-0.sanjose1-nbr1.bbnplanet.net (4.0.1.2) | San Jose, CA - confidence 85 |
| p1-0-0.sanjose1-br2.bbnplanet.net (4.0.1.82) | San Jose, CA - confidence 100 |
| NSanjose-core0.nap.net (207.112.242.253) | San Jose, CA - confidence 90 |
| NSeattle1-core0.nap.net (207.112.247.138) | Seattle, WA - confidence 95 |
| sea-atm0.starcom-accesspoint.net (207.112.243.254) | Seattle, WS - confidence 95 |
| van-atm10.10.starcom.net (209.153.195.49) | Vancouver, British Columbia Canada - confidence 100 |
| hume.worldway.net (209.153.199.15) | Vancouver, British Columbia Canada |

The system 10 assigns a confidence level of 99 indicating that the entry is contained in the database 20 and has been checked by a person for confirmation. While confirmations may be performed by persons, such as an analyst, according to other aspects of the invention the confirmation may be performed by an Artificial Intelligence system or any other suitable additional system, module, device, program, entities, etc. The system 10 reserves a confidence level of 100 for geographic information that has been confirmed by an Internet Service Providers (ISP). The ISP would provide the system 10 with the actual mapping of IP addresses against geography. Also, data gathered with the system 10 through dialing ISPs is given a 100 confidence level because of a definite connection between the geography and the IP address. Many of these hosts, such as intermediate host 32, will be repeatedly traversed when the system 10 searches for new target hosts, such as target host 34, and the confidence level of their geographic location should increase up to a maximum 99 unless confirmed by an ISP or verified by a system analyst. The confidence level can increase in a number of ways, such as by a set amount with each successive confirmation of the host's 32 geographic location.

The system 10 takes advantage in common naming conventions in leading to reasonable guesses as to the geographic location of the hosts. For example, any host that contains "sanjose" in the first part of its host name is probably located in San Jose, Calif. or connected to a system that is in San Jose, Calif. These comparison rule sets are implemented in the system 10 as entries in the database 20. The database 20 may have look-up tables listing geographic locations, such as city, county, regional, state, etc, with corresponding variations of the names. Thus, the database 20 could have multiple listings for the same city, such as SanFrancisco, SanFran, and Sfrancisco all for San Francisco, Calif.

Often a block of IP addresses are assigned and sub-assigned to organizations. For example, the IP block that contains the target address 209.153.199.15 can be queried:

```
> whois 209.153.199.15@whois.arin.net
[whois.arin.net]
Starcom International Optics Corp.      209.153.192.0 -209.153.255.255
  (NETBLK-STARCOM97) STARCOM97
WORLDWAY HOLDINGS INC.                  209.153.199.0 -209.153.199.255
  (NETBLK-WWAY-NET-01)
  WWAY-NET-01
```

From the results of this query, the system 10 determines that the large block from 209.153.192.0 to 209.153.255.255 is assigned to Starcom International Optics Corp. Within this block, Starcom has assigned Worldway Holdings Inc. the 209.153.199.0 to 209.153.199.255 block. By further querying this block (NETBLK-WWAY-NET-01) the collection system 10 gains insight into where the organization exists. In this case the organization is in Vancouver, British Columbia, as shown below.

```
> whois NETBLK-WWAY-NET-01@whois.arin.net
[whois.arin.net]
WORLDWAY HOLDINGS INC. (NETBLK-WWAY-NET-01)
   1336 West 15th Street
   North Vancouver, BC V7L 2S8
   CA
   Netname: WWAY-NET-01
   Netblock: 209.153.199.0 - 209.153.199.255
   Coordinator:
      WORLDWAY DNS (WD171-ORG-ARIN)
      dns@WORLDWAY.COM
      +1 (604) 608.2997
   Domain System inverse mapping provided by:
   NS1.MYDNS.COM           209.153.199.2
   NS2.MYDNS.COM           209.153.199.3
```

With the combination of the trace and the IP block address information, the collection system 10 can be fairly certain that the host "digitalenvoy.net" is located in Vancouver, British Columbia. Because the collection system 10 "discovered" this host using automatic methods with no human intervention, the system 10 preferably assigns a confidence level slightly lower than the confidence level of the host that led to it. Also, the system 10 will not assume the geographic location will be the same for the organization and the sub-block of IP addresses assigned since the actual IP address may be in another physical location. The geographic locations may easily be different since IP blocks are assigned to a requesting organization and no indication is required for where the IP block will be used.

B. Obtaining Geographic Location Data from ISPs

Figure 3:
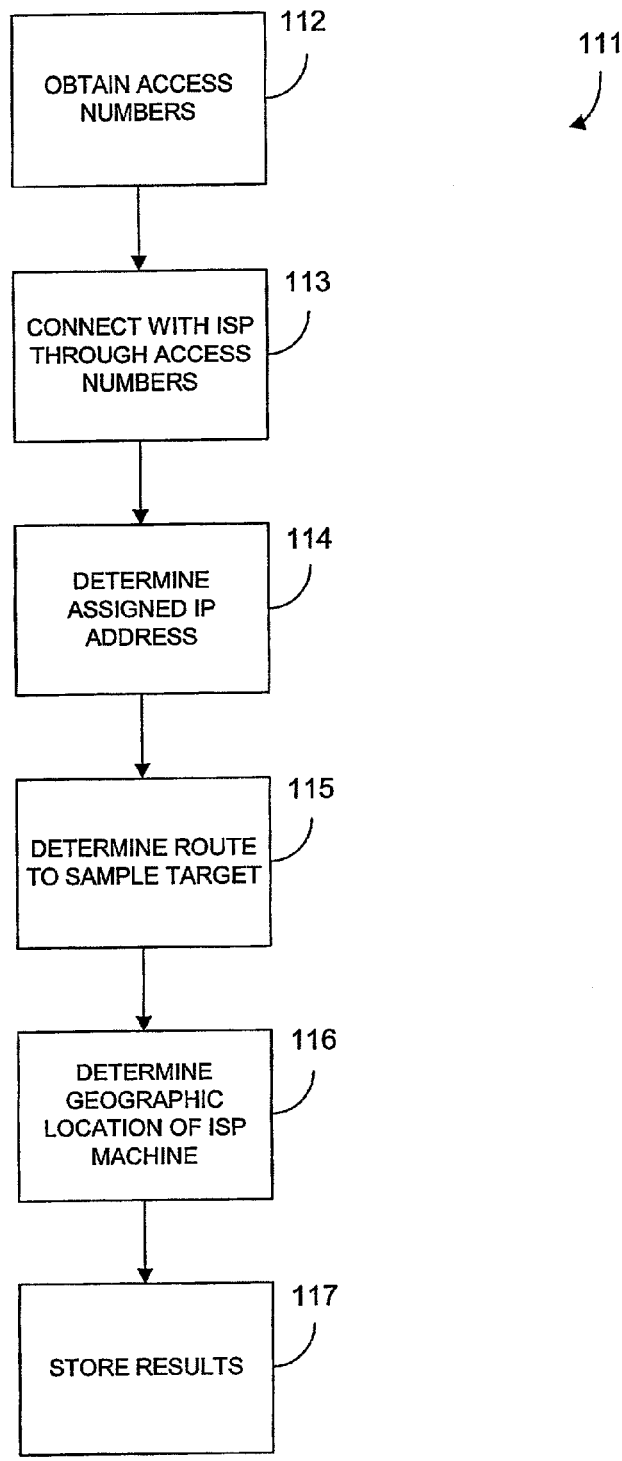
FIG. 3 is a flow chart depicting a preferred method of obtaining geographic information through an Internet Service Provider (ISP)

A method 111 for obtaining geographic locations from an ISP will now be described with reference to FIG. 3. At 112, the collection system 10 obtains access numbers for the ISP. The access numbers in the preferred embodiment are dial-up numbers and may be obtained in any suitable manner, such as by establishing an account with the ISP. Next, at 113, the collection system 10 connects with the ISP by using one of the access numbers. When the collection system 10 establishes communications with the ISP, the ISP assigns the collection system 10 an IP address, which is detected by the collection system 10 at 114.

The collection system 10 at 115 then determines the route to a sample target host and preferably determines this route through a traceroute. The exact target host that forms the basis of the traceroute as well as the final destination of the route is not important so any suitable host may be used. At 116, the collection system 10 analyzes the route obtained through traceroute to determine the location of the host associated with the ISP. Thus, the collection system 10 looks in a backward direction to determine the geographic location of the next hop in the traceroute. At 117, the collection system 10 stores the results of the analysis in the database 20.

With the method 111, the collection system 10 can therefore obtain the geographic locations of IP addresses with the assistance of the ISPs. Because the collection system 10 dials-up and connects with the ISP, the collection system 10 preferably performs the method 111 in a such a manner so as to alleviate the load placed on the ISP. For instance, the collection system 10 may perform the method 111 during off-peak times for the ISP, such as during the night. Also, the collection system 10 may control the frequency at which it connects with a particular ISP, such as establishing connections with the ISP at 10 minute intervals.

C. Determining Geographic Location Data

Figure 4:
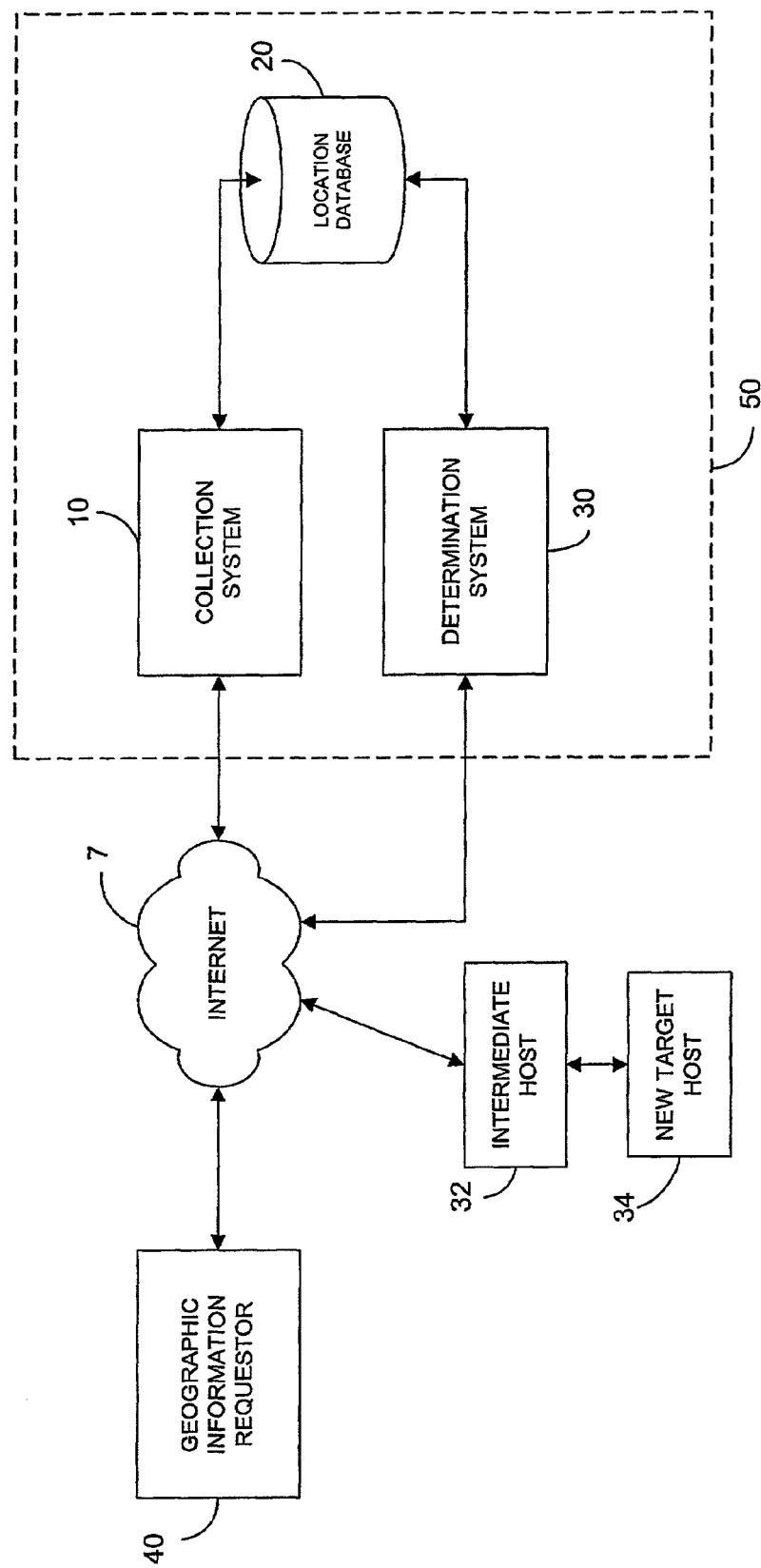
FIG. 4 is a block diagram of a network having a collection system and determination system according to a preferred embodiment of the invention.

With reference to FIG. 4, according to another aspect, the invention relates to a geographic determination system 30 that uses the database 20 created by the collection system 10. The determination system 10 receives requests for a geographic location and based on either the IP address or host name of the host being searched for, such as target host 34. A geographic information requestor 40 provides the request to, and the response from, the determination system 30 in an interactive network session that may occur through the Internet 7 or through some other network. The collection system 10, database 20, and determination system 30 can collectively be considered a collection and determination system 50.

Figure 5:
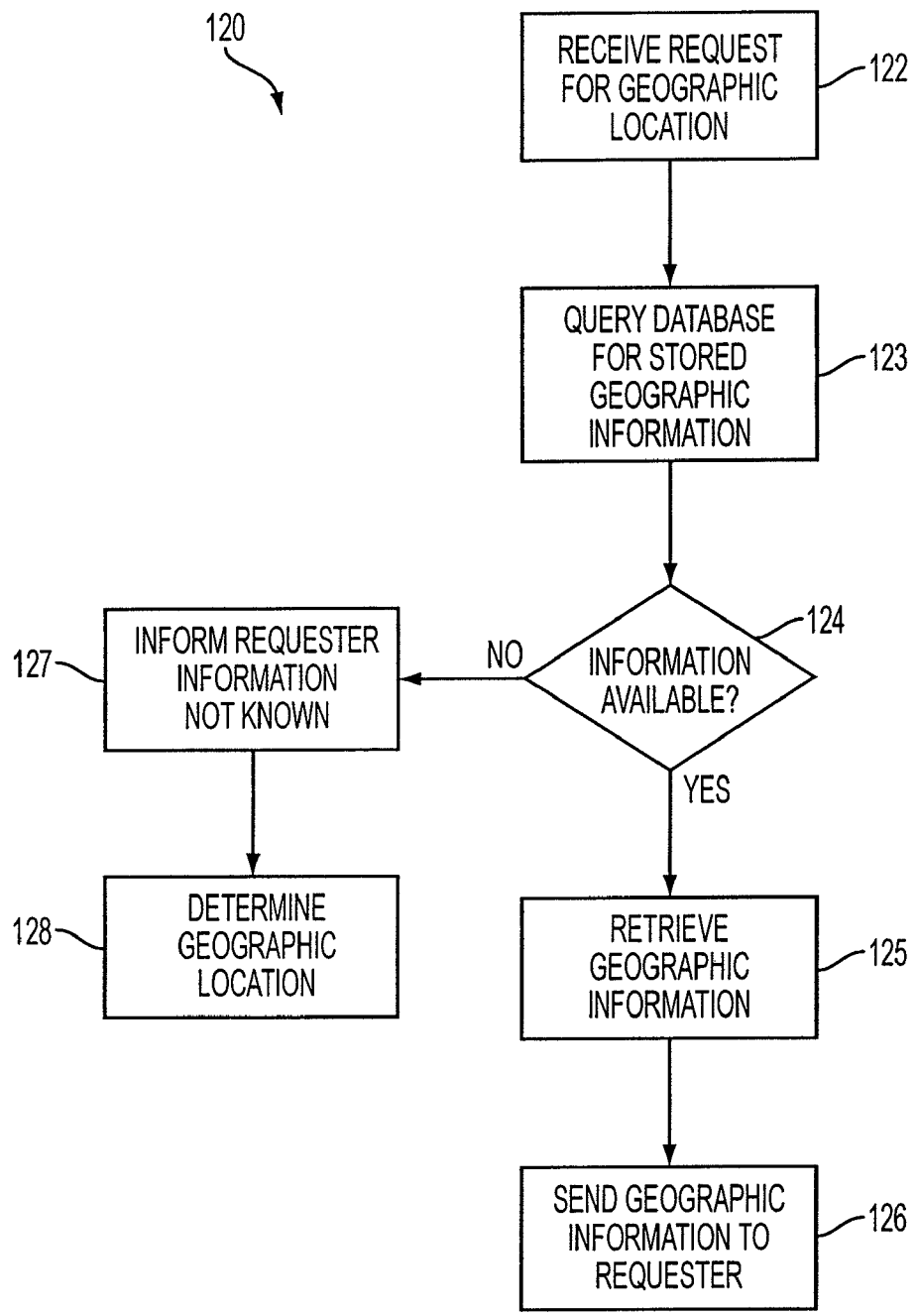
FIG. 5 is a flow chart depicting a preferred method of operation for the collection and determination system.

A preferred method 120 of operation for the determination system 30 will now be described with reference to FIG. 5. At 122, the system 30 receives a request for the geographic location of an entity and, as discussed above, receives one or both of the IP address and domain name. At 123, the determination system 30 searches the database 20 for the geographic location for the data provided, checking to see if the information has already been obtained. When searching for an IP address at 123, the system 30 also tries to find either the same exact IP address listed in the database 20 or a range or block of IP addresses listed in the database 20 that contains the IP address in question. If the IP address being searched for is within a block of addresses, the determination system 30 considers it a match, the information is retrieved at 125, and the geographic information is delivered to the requestor 40 at 126. If the information is not available in database 20, as determined at 124, then at 127 the system 30 informs the requestor 40 that the information is not known. At 128, the system 30 then determines the geographic location of the unknown IP address and stores the result in the database 20. As an alternative at 127 to stating that the geographic location is unknown, the system 30 could determine the geographic information and provide the information to the requestor 40.

The determination system 30 looks for both the IP address in the database 20 and also for the domain name. Since a single IP address may have multiple domain names, the determination system 30 looks for close matches to the domain name in question. For instance, when searching for a host name, the system 30 performs pattern matching against the entries in the database 20. When a match is found that suggests the same IP address, the determination system 30 returns the geographic data for that entry to the requestor 40.

An ambiguity may arise when the requestor 40 provides both an IP address and a domain name and these two pieces of data lead to different hosts and different geographic locations. If both data pieces do not exactly match geographically, then the system 30 preferably responds with the information that represents the best confidence. As another example, the system 30 may respond in a manner defined by the requestor 40. As some options, the determination system 30 can report only when the data coincide and agree with each other, may provide no information in the event of conflicting results, may provide the geographic information based only on the IP address, may provide the geographic information based only on the host name, or may instead provide a best guess based on the extent to which the address and host name match.

A sample format of a request sent by the requestor 40 to the determination system 30 is provided below, wherein the search is against the host "digitalenvoy.net" and the items in bold are responses from the geographic determination system 30:

Connecting to server.digitalenvoy.net...
;digitalenvoy.net;
vancouver;british columbia;can;99;

The format of the request and the format of the output from the determination system 30 can of course be altered according to the application and are not in any way limited to the example provided above.

D. Distributing Geographic Location Data

A system for distributing the geographic location information will now be described with reference to FIGS. 6 and 7. According to a first aspect shown in FIG. 6, the geographic information on IP addresses and domain names is collected and determined by the system 50. A web site 60 may desire the geographic locations of its visitors and would desire this information from the collection and determination system 50. The web site 60 includes a web server 62 for receiving requests from users 5 for certain pages and a position targeter 64 for at least obtaining the geographic information of the users 5.

A preferred method 130 of operation of the network shown in FIG. 6 will now be described with reference to FIG. 7. At 132, the web server 62 receives a request from the user 5 for a web page. At 133, the web server 62 queries the position targeter 64 that, in turn, at 134 queries the collection and determination system 50 for the geographic location of the user. Preferably, the position targeter 64 sends the query through the Internet 7 to the collection and determination system 50. The position targeter 64, however, may send the query through other routes, such as through a direct connection to the collection and determination system 50 or through another network. As discussed above, the collection and determination system 50 accepts a target host's IP address, host name, or both and returns the geographic location of the host in a format specified by the web site 60. At 135, the position targeter obtains the geographic location from the collection and determination system 50, at 136 the information that will be delivered to the user 5 is selected, and is then delivered to the user 5 at 137. This information is preferably selected by the position targeter based on the geographic location of the user 5. Alternatively, the position targeter 64 may deliver the geographic information to the web server 62 which then selects the appropriate information to be delivered to the user 5. As discussed in more detail below, the geographic location may have a bearing on what content is delivered to the user, what advertising, the type of content, if any, delivered to the user 5, and/or the extent of content.

Figure 7:
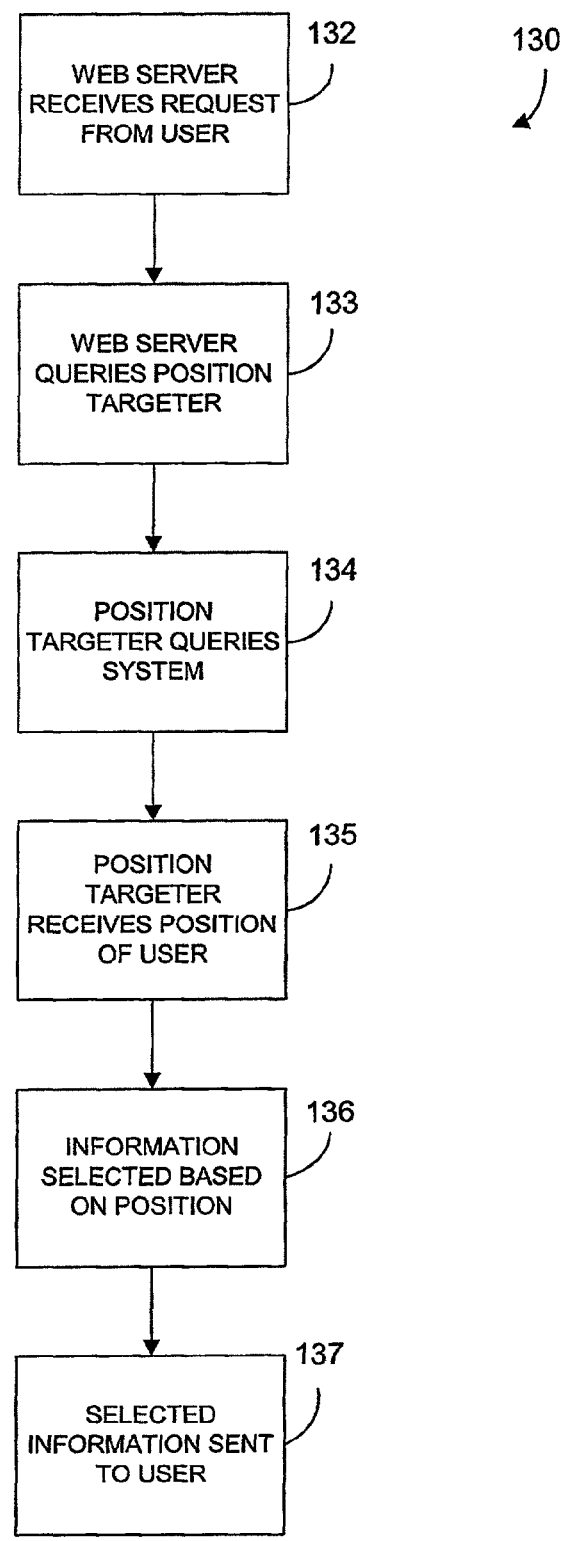
FIG. 7 is a flow chart depicting a preferred method of operation for the web server and position targeter of FIG. 6.
Figure 8:
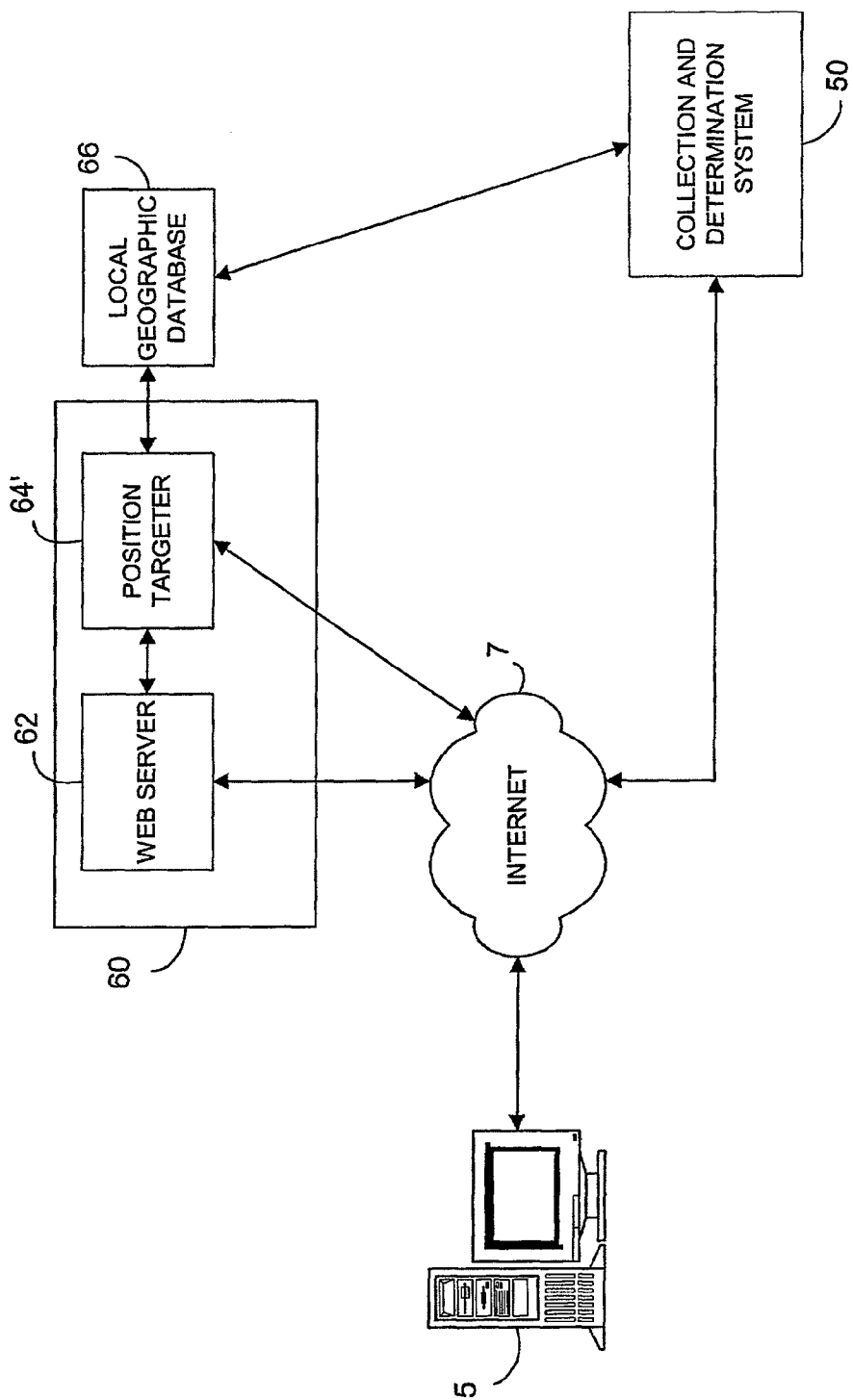
FIG. 8 is a block diagram of a web server using a position targeter having access to a local geographic database as well as the collection and determination system.
Figure 9:
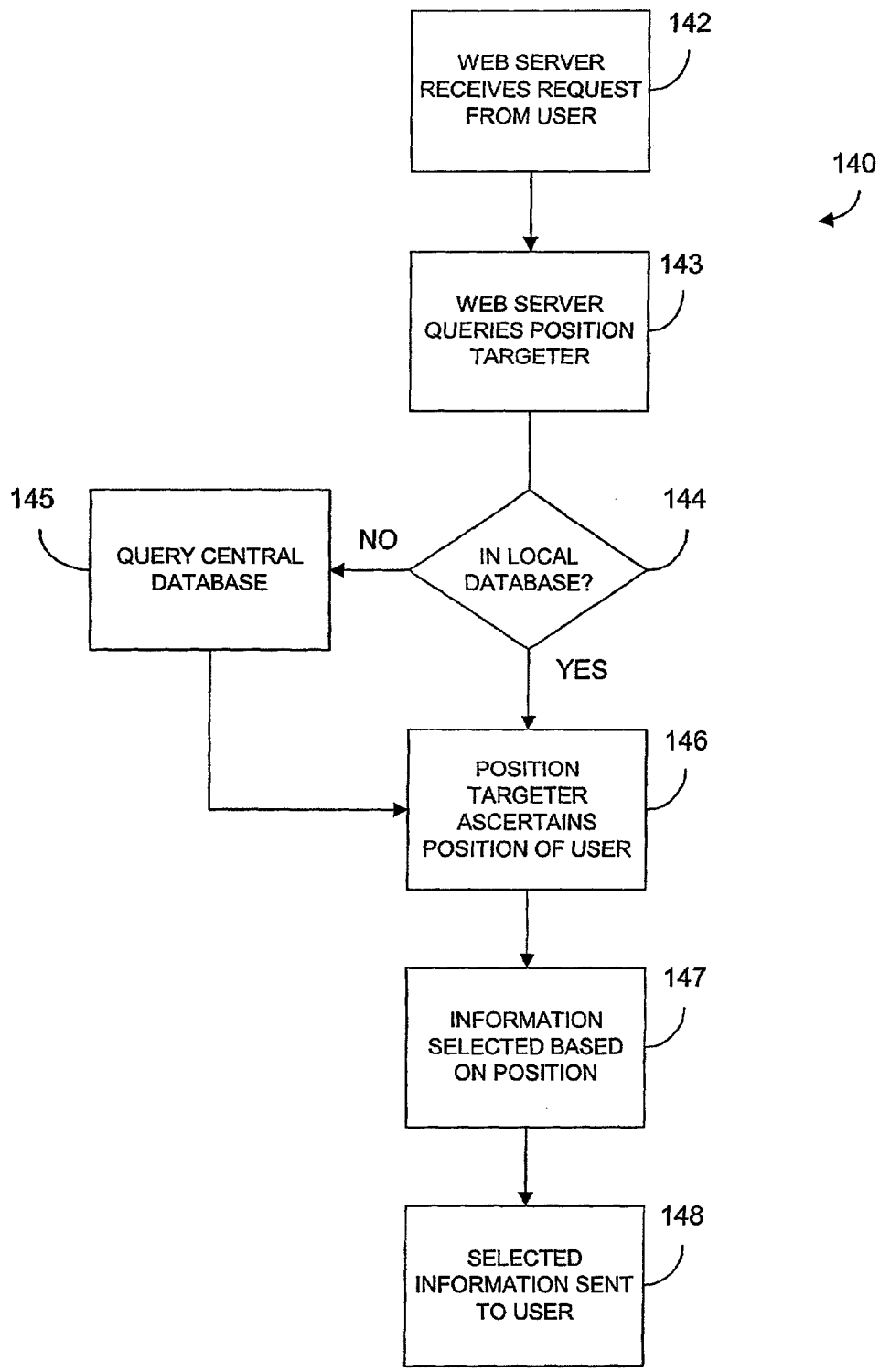
FIG. 9 is a flow chart depicting a preferred method of operation for the web server and position targeter of FIG. 8.

As another option shown in FIG. 8, the web site 60 may be associated with a local database 66 storing geographic information on users 5. With reference to FIG. 9, a preferred method 140 of operation begins at 142 with the web server 62 receiving a request from the user 5. At 143, the web server 62 queries a position targeter 64' for the geographic location information. Unlike the operation 130 of the position targeter 64 in FIGS. 6 and 7, the position targeter 64' next first checks the local database 66 for the desired geographic information. If the location information is not in the database 66, then at 145 the position targeter 64' queries the database 20 associated with the collection and determination system 50.

After the position targeter 64' obtains the geographic information at 146, either locally from database 66 or centrally through database 20, the desired information is selected at 147 based on the geographic location of the user 5. Again, as discussed above, this selection process may be performed by the position targeter 64' or by the web server 62. In either event, the selected information is delivered to the user 5 at 148.

For both the position targeter 64 and position targeter 64', the position targeter may be configured to output HTML code based on the result of the geographic location query. An HTML code based result is particularly useful when the web site 60 delivers dynamic web pages based on the user's 5 location. It should be understood, however, that the output of the position targeter 64 and position targeter 64' is not limited to HTML code but encompasses any type of content or output, such as JPEGs, GIFs, etc.

A sample search against the host "digitalenvoy.net" is shown here (items in bold are responses from the position targeter 64 or 64':
>distributionprogram digitalenvoy.net
vancouver;british columbia;can;99;
The format of the output, of course, may differ if different options are enabled or disabled.

End users 5 may elect a different geographic location as compared to where they have been identified from by the system 50 when it possibly chooses an incorrect geographic location. If this information is passed backed to the position targeter 64 or 64', the position targeter 64 or 64' will pass this information to the determination system 50 which will store this in the database 20 for later analysis. Because this information cannot be trusted completely, the collection and determination system 50 must analyze and verify the information and possibly elect human intervention.

E. Determining Geographic Locations Through a Proxy Server

Figure 10:
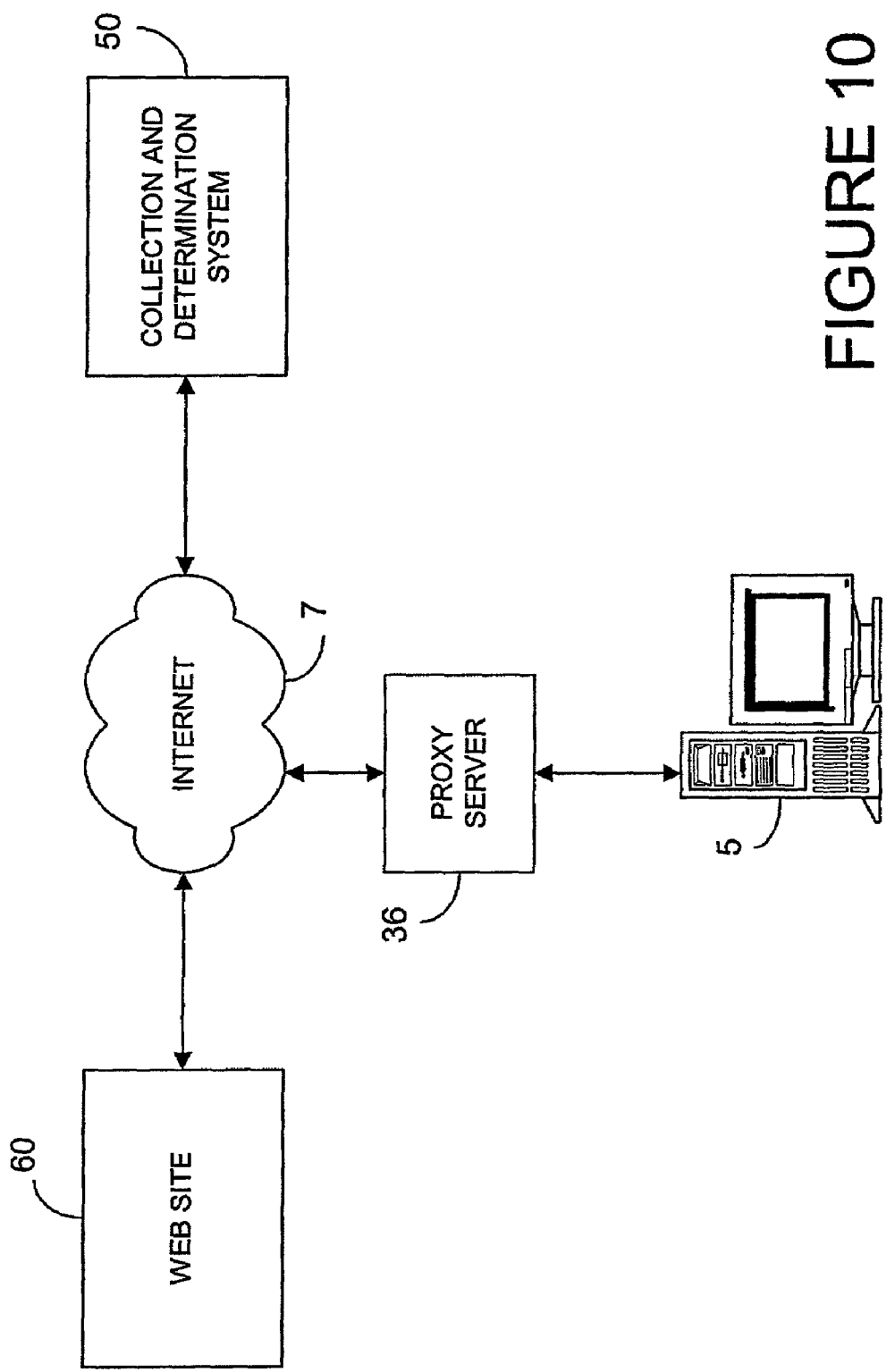
FIG. 10 is a block diagram of a network depicting the gathering of geographical location information from a user through a proxy server.

One difficulty in providing geographic information on a target host is when the target host is associated with a caching proxy server. A caching proxy will make requests on behalf of other network clients and save the results for future requests. This process reduces the amount of outgoing bandwidth from a network that is required and thus is a popular choice for many Internet access providers. For instance, as shown in FIG. 10, a user 5 may be associated with a proxy server 36.

In some cases, this caching is undesirable since the data inside them becomes stale. The web has corrected this problem by having a feature by which pages can be marked uncacheable. Unfortunately, the requests for these uncacheable pages still look as if they are coming from the proxy server 36 instead of the end-user computers 5. The geographic information of the user 5, however, may often be required.

A method 150 of determining the geographic information of the user 5 associated with the proxy server 36 will now be described with reference to FIG. 11. In the preferred embodiment, the user 5 has direct routable access to the network; e.g. a system using Network Address Translation will not work since the address is not a part of the global Internet. Also, the proxy server 36 should allow access through arbitrary ports whereby a corporate firewall which blocks direct access on all ports will not work. Finally, the user 5 must have a browser that supports Java Applets or equivalent such functionality.

Figure 6:
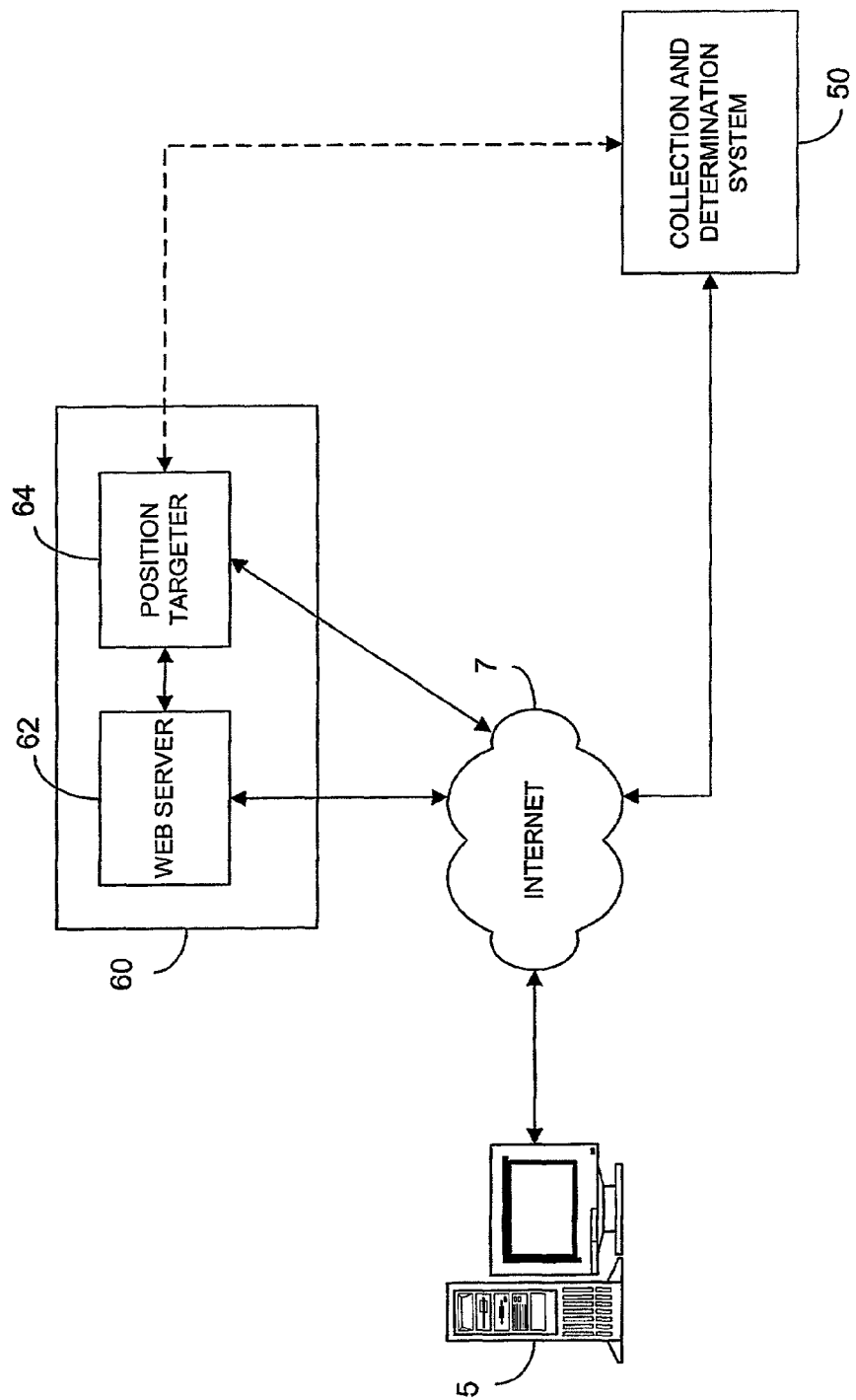
FIG. 6 is a block diagram of a web server using a position targeter connected to the collection and determination system.
Figure 11:
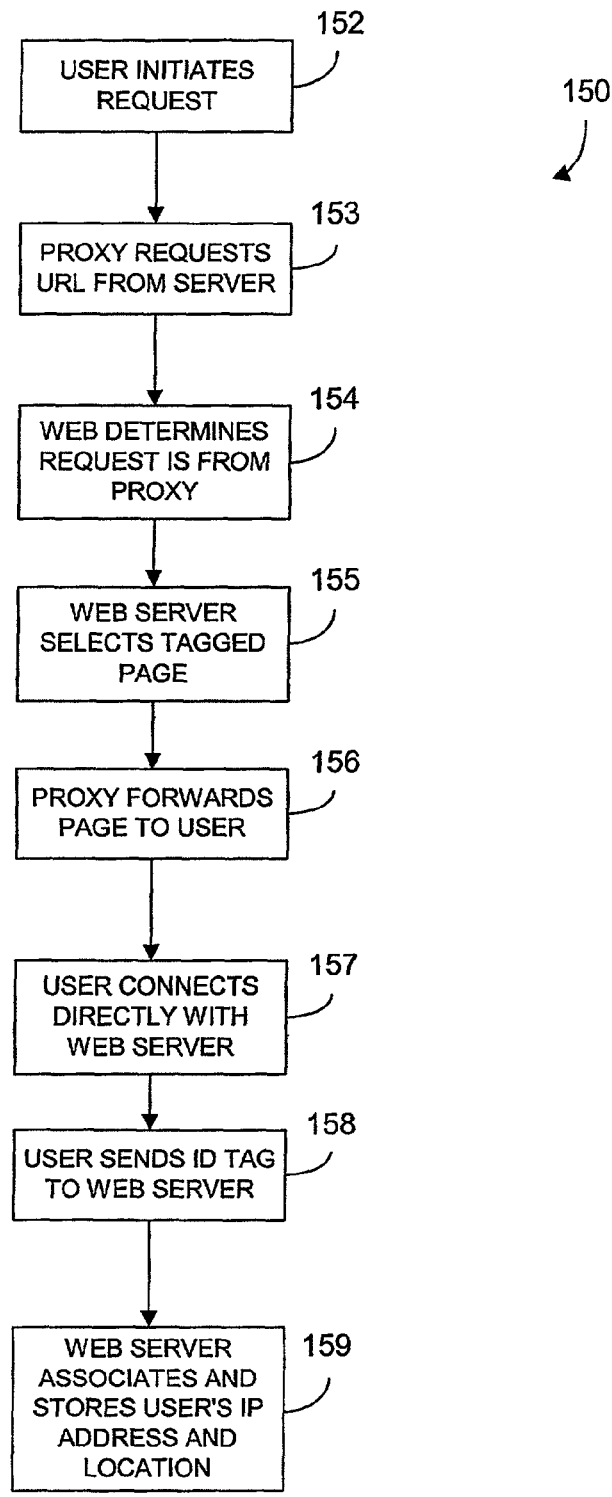
FIG. 11 is a flow chart depicting a preferred method of operation for gathering geographic information through the proxy server.

With reference to FIG. 11, at 152, a user 5 initiates a request to a web server 62, such as the web server 62 shown in FIG. 6 or FIG. 8. At 153, the HTTP request is processed by the proxy server 36 and no hit is found in the proxy's cache because the pages for this system are marked uncacheable. On behalf of the user 5, the proxy server 36 connects to the web server 62 and requests the URL at 153. At 154, the web server 62 either through the local database 66 or through the database 20 with the collection and determination system 50, receives the request, determines it is coming from a proxy server 36, and then at 155 selects the web page that has been tagged to allow for the determination of the user's 5 IP address. The web page is preferably tagged with a Java applet that can be used to determine the IP address of the end-user 5. The web server 62 embeds a unique applet parameter tag for that request and sends the document back to the proxy server 36. The proxy server 36 then forwards the document to the user 5 at 156.

At 157, the user's 5 browser then executes the Java Applet, passing along the unique parameter tag. Since by default applets have rights to access the host from which they came, the applet on the user's 5 browser opens a direct connection to the client web server 62, such as on, but not limited to, port 5000. The web server 62, such as through a separate server program, is listening for and accepts the connection on port 5000. At 158, the Java applet then sends back the unique parameter tag to the web server 62. Since the connection is direct, the web server 62 at 159 can determine the correct IP address for the user 5, so the web server 62 now can associate the session tag with that IP address on all future requests coming from the proxy server 38.

As an alternative, at 155, the web server 62 may still deliver a web page that has a Java applet. As with the embodiment discussed above, the web page having the Java applet is delivered by the proxy server to the user 5 at 156 and the user 5 connects with the web server 62 at 157. The Java applet according to this embodiment of the invention differs from the Java applet discussed above in that at 158 the Java applet reloads the user's browser with what it was told to load by the web server 62. The Java applet according to this aspect of the invention is not associated with a unique parameter tag that alleviates the need to handle and to sort the plurality of unique parameter tags. Instead, with this aspect of the invention, the web server 62 at 159 determines the IP address and geographic location of the user 5 when the Java applet connects to the web server 62.

II. Tailoring an Internet Site Based on Geographic Location of its Visitors

The web site 60 can tailor the Internet site based upon the geographic location or Internet connection speed of an Internet user 5. When the user 5 visits the Internet site 60, the Internet site 60 queries a database, such as local database 66 or central database 20, over the Internet which then returns the geographic location and/or Internet connection speed of the user based upon the user's IP address and other relevant information derived from the user's "hit" on the Internet site 60. This information may be derived from the route to the user's 5 machine, the user's 5 host name, the hosts along the route to the user's machine 5, via SNMP, and/or via NTP but not limited to these techniques. Based on this information the Internet site 60 may tailor the content and/or advertising presented to the user. This tailoring may also include, but not be limited to, changing the language of the Internet site to a user's native tongue based on the user's location, varying the products or advertising shown on an Internet site based upon the geographic information and other information received from the database, or preventing access based on the source of the request (i.e. "adult" content sites rejecting requests from schools, etc.). This tailoring can be done by having several alternative screens or sites for a user and having the web server 62 or position targeter 64 or 64' dynamically select the proper one based upon the user's geographic information. The geographic information can also be analyzed to effectively market the site to potential Internet site advertisers and external content providers or to provide media-rich content to users that have sufficient bandwidth.

The methods of tailoring involve tracing the path back to the Internet user's machine 5, determining the location of all hosts in the path, making a determination of the likelihood of the location of the Internet user's machine, determining other information about the hosts, which may or may not be linked to its geographic location, in the path to and including the Internet user's machine by directly querying them for such information (by using, but not limited by, SNMP or NTP for example), or alternatively, there is a complete database that may be updated that stores information about the IP addresses and host names which can be queried by a distant source which would then be sent information about the user.

The web site 60 dynamically changes Internet content and/or advertising based on the geographic location of the Internet user 5 as determined from the above methods or processes. The web site 60 presents one of several pre-designed alternative screens, presentations, or mirror sites depending on the information sent by the database as a result of the user 5 accessing the web site 60.

As discussed above, the selection of the appropriate information to deliver to the user 5 based on the geographic location can be performed either by the web server 62 or the position targeter 64 or 64'. In either case, the web site can dynamically adapt and tailor Internet content to suit the needs of Internet users 5 based on their geographic location and/or connection speed. As another option, the web site 60 can dynamically adapt and tailor Internet advertising for targeting specific Internet users based on their geographic location and/or connection speed. Furthermore, the web site 60 can dynamically adapt and tailor Internet content and/or advertising to the native language of Internet users 5 which may be determined by their geographic location. Also, the web site 60 can control access, by selectively allowing or disallowing access, to the Internet site 60 or a particular web page on the site 60 based on the geographic location, IP Address, host name and/or connection speed of the Internet user. As another example, the web site can analyze visits by Internet users 5 in order to compile a geographic and/or connection speed breakdown of Internet users 5 to aid in the marketing of Internet sites.

A. Credit Card Fraud

In addition to using geographic location information to target information to the user, the web site 60 or the collection and determination system 50 can provide a mechanism for web sites owners to detect possible cases of online credit card fraud. When a user 5 enters information to complete an online order, he/she must give a shipping and billing address. This information cannot currently be validated against the physical location of the user 5. Through the invention, the web site 60 determines the geographic location of the user 5. If the user 5 enters a location that he is determined not to be in, there could be a possible cause of fraud. This situation would require follow up by the web site owner to determine if the order request was legitimate or not.

B. Traffic Management

Figure 12A:
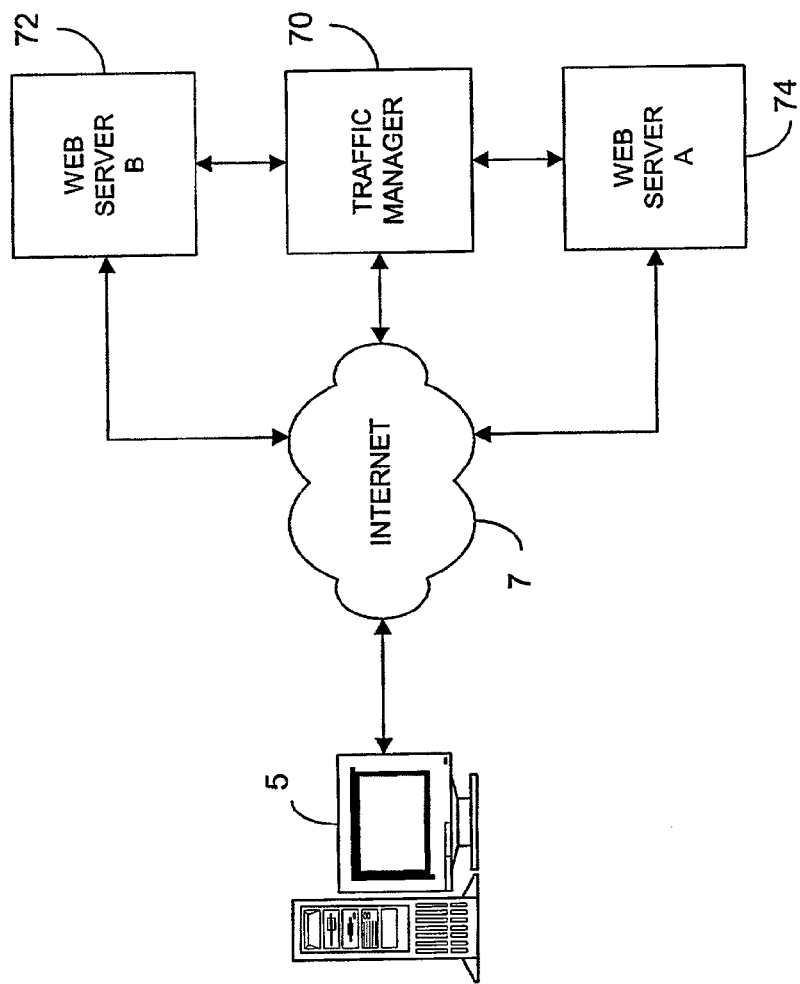
FIG. 12(A) is a block diagram of a traffic manager according to a preferred embodiment of the invention.

In addition to using geographic information to detect credit card fraud, the geographic information can also be used in managing traffic on the Internet 7. For example, with reference to FIG. 12(A), a traffic manager 70 has the benefit of obtaining the geographic information of its users or visitors 5. The traffic manager 70 may employ the local database 66 or, although not shown, may be connected to the collection and determination system 50. After the traffic manager 70 detects the geographic location of the users 5, the traffic manager 70 directs a user's 5 request to the most desirable web server, such as web server A 74 or web server B 72. For instance, if the user 5 is in Atlanta, the traffic manager 70 may direct the user's request to web server A 74 which is based in Atlanta. On the other hand, if the user 5 is in San Francisco, then the traffic manager 70 would direct the user 5 to web server B 72, which is located in San Francisco. In this manner, the traffic manager 70 can reduce traffic between intermediate hosts and direct the traffic to the closest web server.

To most efficiently determine the best server to respond to a request from a user on a network, the traffic manager 70 preferably has an entire map of the network, such as a map of the Internet. The map may be stored in database 66, the same database 20 as the geographic locations of Internet users or a separate database. The map of the network ideally includes as much information as possible on the network so that the traffic manager 70 can intelligently route traffic to the most desirable server. The information on the network includes, but is not limited to, (1) the routers, switches, hubs, hosts, and other nodes (collectively "nodes") within a network, (2) the geographic locations of the nodes; (3) the total bandwidth available at each node; (4) the available capacity at each node; (5) the traffic patterns between the nodes; (6) the latency times and speeds between nodes; (7) the health or status of the links between nodes and the nodes themselves, such as which nodes have crashed, which link are undergoing maintenance, etc; and (8) historical and predicted performance of the network, nodes, and links, such as daily, seasonal, yearly trends in performance and predicted performance modeled considering past performance, present data, and knowledge of future events. It should be understood that this list of possible information stored in the database is only exemplary and that the database may include less than all of the information as well as other pieces of data.

As can be appreciated, for any large network, a comprehensive database with this map of the network could quickly become unmanageable and discovery of the optimal response source would take a significant amount of time and resources. The time spent in determining this ideal route may very easily offset any gain that would be realized by routing the traffic to a quicker server. For practical reasons, the traffic manager 70 and the database should perform some approximation or partial mapping of the network. For example, a complete or semi-complete map of the entire network, such as the Internet, can be formed of the most pertinent data which allows the traffic manager 70 to efficiently deliver responses to users.

The information on a network can be obtained in any number of ways. One way of completing a map of the network backbone and infrastructure will now be described with reference to FIG. 12(B). A set of machines shown in the figure as analyzers are deployed to analyze interconnections between hosts and to store the gathered intelligence in one or more databases. The analyzers may use any tool to obtain intelligence, such as the network tool traceroute, and this intelligence includes each host and the direct links each node has to other nodes. The analyzers take the traceroute information to determine the latency time between two interconnected nodes and to determine the speed of the interconnection between two nodes. Since the traceroute information is a byproduct of the analysis to determine the geographic location of users, the collection system, determination system, or collection and determination system may serve as the analyzers. Alternatively, the analyzers may exist as separate systems or machines.

Figure 12B:
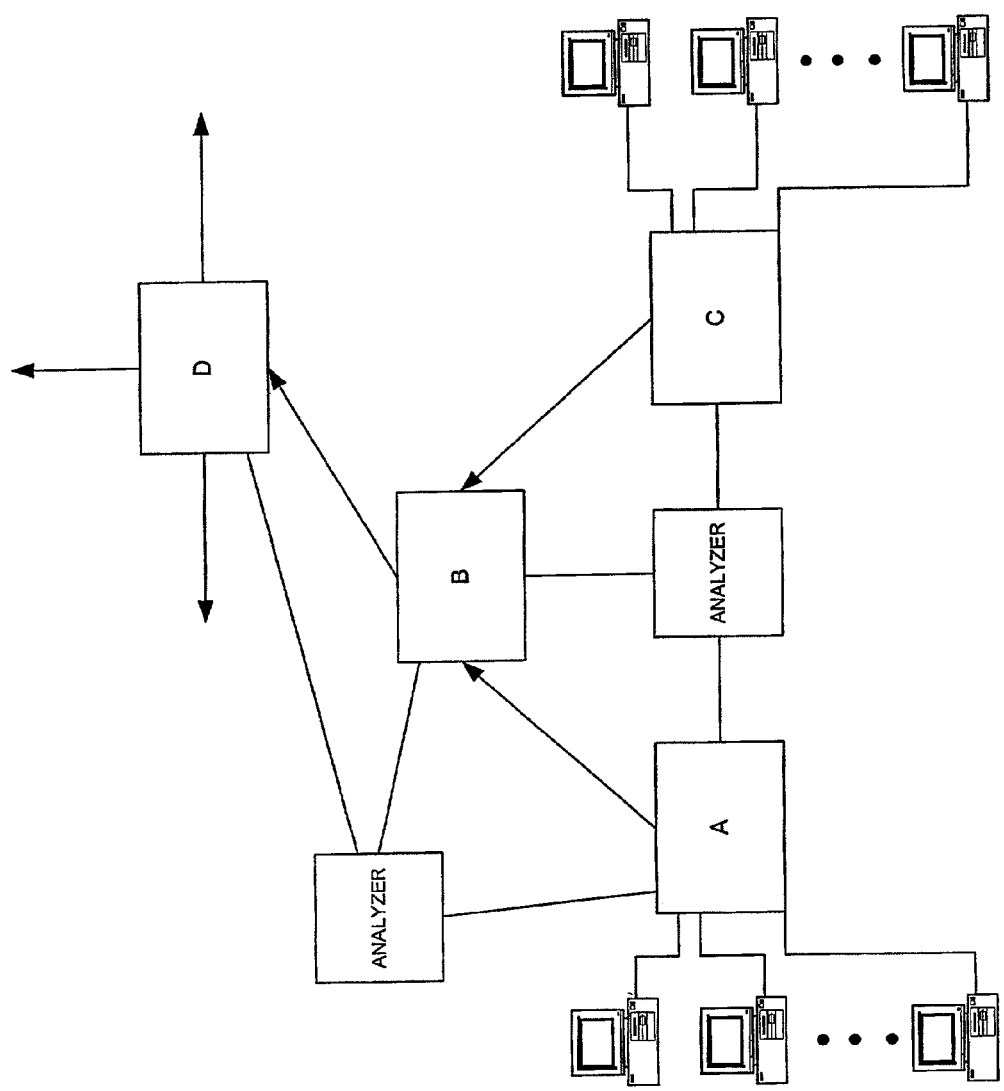
FIG. 12(B) is a network diagram of analyzers and network traffic.

In the example shown in FIG. 12(B), 100 users each with their own address are connected to a single server, machine A, and 100 other users each with their own address are connected to a single server, machine C. In monitoring the network, the analyzers determine that machine A always forwards all requests to machine B and that machine C always forward all requests to machine B. Machine B, in turn, always forwards requests from machine A and from machine C to machine D. Machine D then has multiple routes through which it can send user requests. In mapping the network, because a response to any request from users connected to either A or C will be routed through machine D, the analyzer treats all 200 users on machines A or C as having the address of machine D. By eliminating the need to analyze the position and interconnects of machine A, B, and C, the analyzer reduces the problem set to an approximation which is more manageable. This analysis can be performed for all addresses that will request information that will be efficiently routed on the network.

In the example mentioned above, machines A and C forwarded all of their requests to machine B and machine B forwarded all of the requests to machine D. As a result, the analyzers could effectively and accurately reduce this set of interconnections to a model in which the users are all connected to machine D. In reality, however, machines A and C may send some traffic to other machines or to each other and machine B may send some traffic to machines other than machine D. Nonetheless, through probability and statistics, the analyzers can determine the most likely paths of travel and make corresponding approximations or simplifications of the network.

The traffic manager 70 can obtain intelligence on the network in ways other than through the analyzers. For example, the components forming the network or administrators of the network may monitor the nodes and overall network and provide performance data to the traffic manager 70. Also, the traffic manager 70 can obtain this information from third parties, such as through other systems that are able to gather this intelligence.

As discussed above, the traffic manager 70 can route traffic on the network based on the geographic location of the origination and destination points, such as user and web site, and also based on the geographic locations of intermediate nodes. At times, the closest server or node to a user does not necessarily correspond to the best server to respond or handle the user's request. For example, traffic should not be sent to a server or node that has crashed, which has no additional available bandwidth, or which has interrupted or slow intermediate network links. In the case of a server or node crash, the analyzers continually monitor all servers to ensure that they are providing optimal performance. In the case of slow or down network links, the analyzers monitor all links that could impact the decisions of which server to use. Finally, the analyzers measure the total available bandwidth to a responding server and the connection speeds of the users. By knowing the available bandwidth a user has due to the mapping of IP address to connection speed, the traffic manager 70 can direct the user to the server that has enough available bandwidth to properly accommodate that user. Thus, while the geographic locations of the end points and intermediate nodes is considered, the traffic manager 70 does not necessarily route traffic to the closest servers if other servers, even if they are farther away, can provide faster, better, or more reliable service.

The traffic manager 70 can be positioned anywhere within a network. An one example, the traffic manager 70 can be associated with DNS service. When used as a DNS service, a content provider interfaces with the DNS service to define in what conditions and situations a particular user would be sent to a particular server. These conditions are based, for example, on the geographic location of the user, the network location of the user, the bandwidth and latency between the user and available servers, the user's available bandwidth, the server's available bandwidth, and the time of day. The user is then directed to the server that best suites his profile based on the criteria set by the content provider. The DNS response would be sent with a time to live (TTL) of 0 so that every new request would go through a name resolution process so that the user is sent to the appropriate server at the time of the request. In this example of the traffic manager 70 being associated with DSN service, the web server A 74 and web server B 72 may comprise mirror-imaged web servers associated with the same web site.

As another example, the traffic manager 70 may be associated with a server or node within the Internet and perform a redirect. In this example of an HTTP redirect, the same criteria would be used in determining where the user would be sent. One difference is that the traffic manager 70 acts as the front end for a site, such as a content provider, and redirects a user from this machine to the appropriate machine after being contacted by a user. As with the DNS example, the traffic manager 70 can perform the redirect based on available bandwidth at servers 74 and 72, connection speeds of the servers 74 and 72, geographic locations, load balancing, etc.

The traffic manager 70 performs this analysis to determine the proper server to have an individual user access. By doing this series of analyses, the user will be assured the best possible performance.

C. Traffic Reporting and Managing

As mentioned above with reference to FIGS. 12(A) and 12(B), the traffic managers 70 contain information on the Internet or other network, with this information including information on nodes, the geographic locations of the nodes, the total bandwidth available at each node, the available capacity at each node, traffic patterns between the nodes, the latency times and speeds between nodes, the health or status of the links between nodes and the nodes themselves, and historical and predicted performance of the network. This information may be stored in the databases associated with the traffic managers, such as in the form of a map of the network. Also, as described above, this information can be obtained in a number of ways. These ways include use of the analyzers depicted in FIG. 12(B), through the efforts of the traffic managers 70 themselves, or through other systems.

Also, as discussed above, this network information can be used in a number of ways. For example, this information may be used in directing traffic through the most optimal or efficient route. In selecting a route, the traffic managers 70 can factor in the geographic locations of the origination and destination points, the geographic locations of intermediate nodes, bandwidth available at various nodes, the status of nodes, etc. Essentially, the traffic managers 70 can route the traffic using any or all of the information on the network, the origination or destination points, or any intermediate node or network. Furthermore, the traffic manager 70 may be positioned anywhere within the network, including at one or more of the nodes, at the origination or destination points, or as part of the DNS service.

Figure 12C:
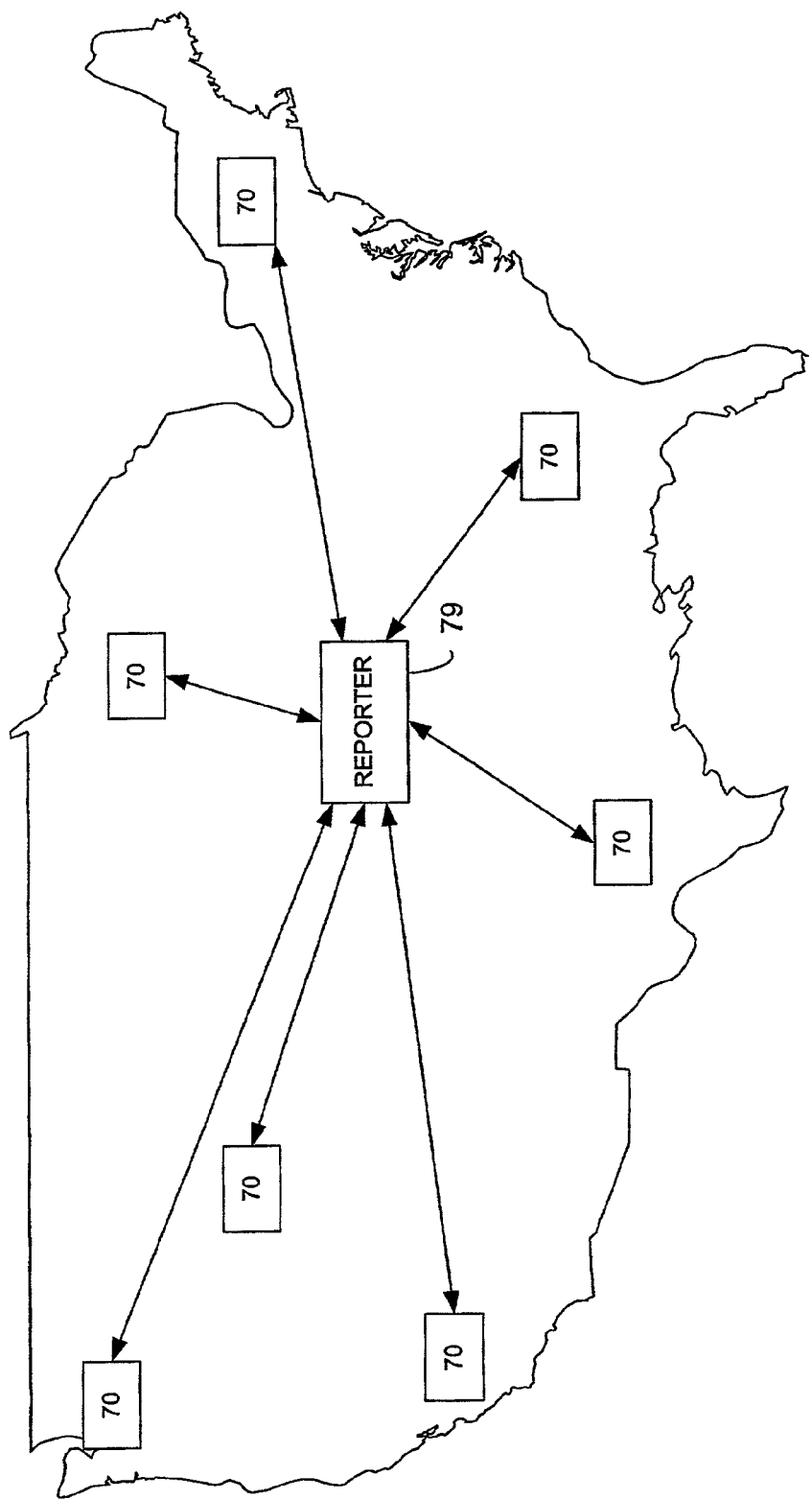
FIG. 12(C) is a diagram of a network according to another aspect of the invention which includes a traffic reporter.

The information that is available at the traffic managers 70 reflects normal network traffic conditions. These conditions may be based on averages over a period of time, such as the past day, week, month, or year. According to one aspect of the invention as shown in FIG. 12(C), a traffic reporter 79 communicates with the traffic managers 70 on real-time traffic conditions. The traffic reporter 79 preferably sends periodical or occasional traffic reports to the traffic managers providing those traffic managers 70 with updates on traffic conditions within the network. Additionally, the traffic managers 70 monitor local conditions and provide updates to the traffic reporter 79. The traffic reporter 79 gains information on traffic conditions and other network information from sources other than itself or the traffic managers 70, such as through the analyzers described with reference to FIG. 12(B). Additional details on the traffic reporter 79 and operation of the traffic managers 70 will be described below with reference to FIGS. 12(D) and 12(E).

Figure 12D:
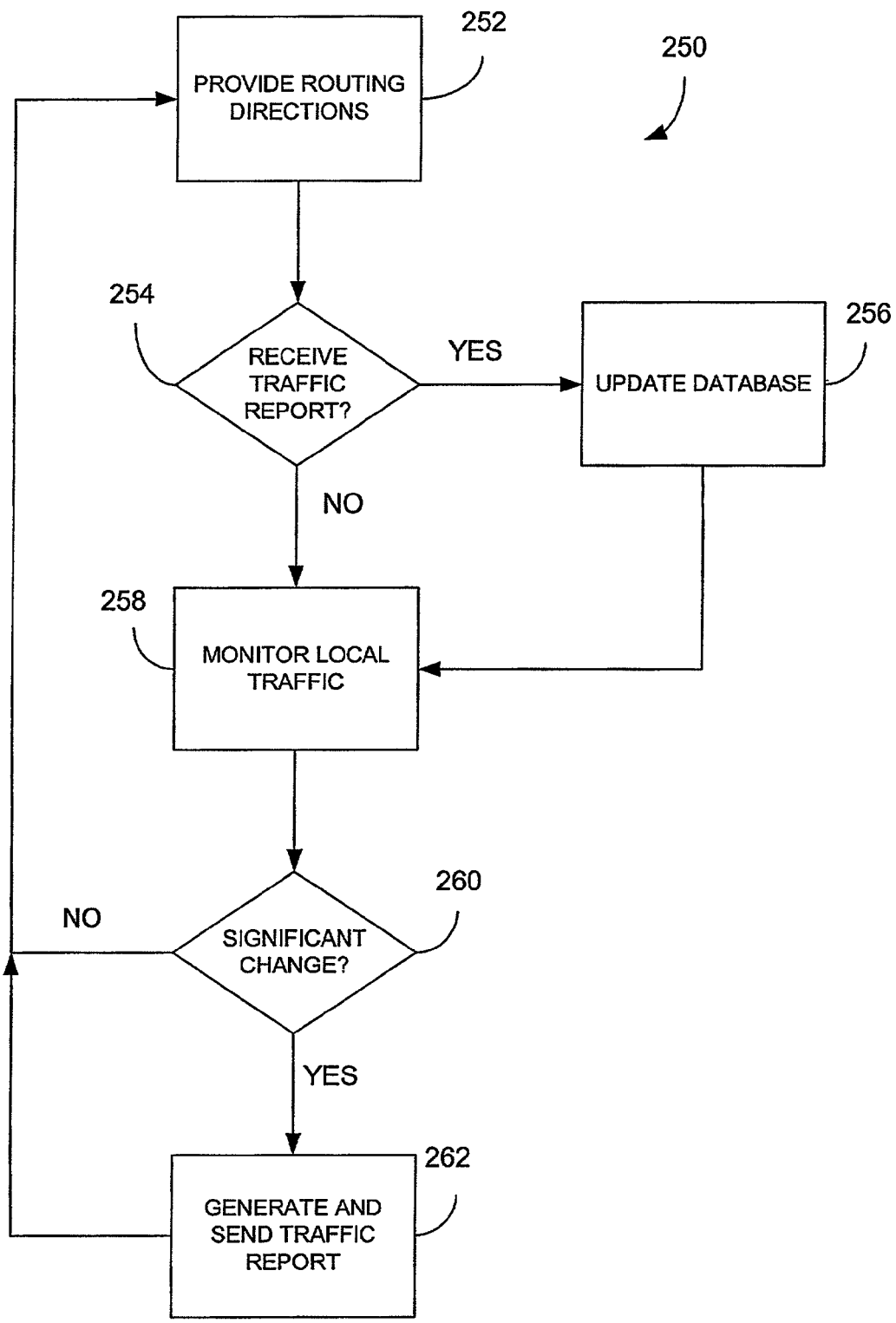
FIG. 12(D) is a flow chart of operation for the traffic managers.

A method 250 of operation for the traffic managers 70 will now be described with reference to FIG. 12(D). At 252, the traffic manager 70 provides routing directions based on information at hand. The traffic manager 70 provides the routing directions in any suitable manner, such as in the manner described above with reference to FIGS. 12(A) and 12(B). For instance, the traffic manager 70 preferably has a database or map of the network and has information on network conditions and traffic. At 254, the traffic manager 70 determines if it has received a report from the traffic reporter 79. Upon receipt of a traffic report, the traffic manager 70 updates its own database at 256 with the most current traffic conditions.

At 258, the traffic manager 70 preferably monitors local traffic conditions in the normal course of operations during the maintenance of its own database. If the traffic manager 70 detects any significant changes, at 260, then the traffic manager 70 reports these changes to the traffic reporter 79 at 262. The traffic manager 70 determines whether the changes are significant in a number of ways, including comparing the current local traffic conditions to the conditions stored in the database. The traffic manager 70 may determine that changes are significant upon any change, upon a change that exceeds some absolute value, or if the change exceeds some percentage. The traffic manager 70 then continues to provide routing directions based on the information in its database at 252.

In updating and maintaining the database at 256, the traffic manager 70 preferably has some historical measure of network conditions and then saves some or all of the data received in the traffic reports as real-time traffic conditions. The historical measures of traffic conditions are used by default in determining the traffic conditions and thus in providing routing directions. The traffic manager 70 preferably references the real-time traffic conditions provided through the traffic reporter 79 to determine if an exception should be made in using the default set of data. Thus, the traffic manager 70 at 252 performs a two step analysis of looking at the default data stored in the database and secondly looking to see if any traffic reports from the traffic reporter 79 have a bearing at a particular request or have a bearing on altering a preliminary set of routing directions derived from the default data.

Figure 12E:
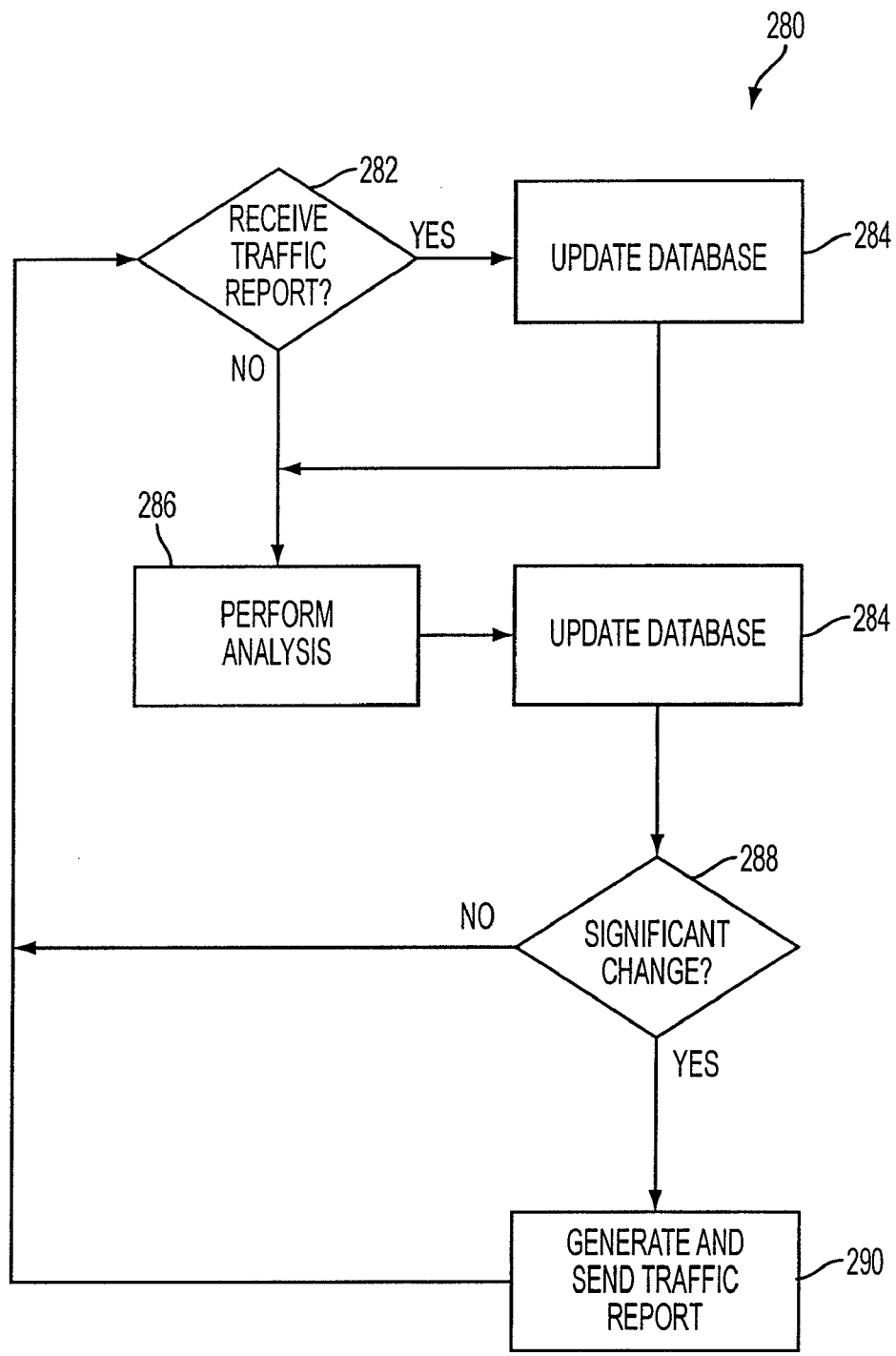
FIG. 12(E) is a flow chart of operation for the traffic reporter.

A method 280 of operation for the traffic reporter 79 will now be described with reference to FIG. 12(E). At 282, the traffic reporter 79 receives any traffic reports from the traffic managers 70. As mentioned above, these traffic reports generated by the traffic managers 70 may be for real-time changes in local traffic detected by the traffic managers 70 themselves. At 282, the traffic reporter 79 may receive network information and other such information on traffic conditions through another source, such as the analyzers. At 286, the traffic reporter 79 performs its own analysis on the network to determine response times, traffic congestion, available bandwidth, available capacity, traffic patterns, latency times and speeds, the health or status of links or nodes, etc. All of the data gathered at 282 or 286 is used at 284 in updating a database or map of the network.

The traffic reporter 79 maintains a database of real-time conditions in the network and also preferably maintains some version of historical measures. At 288, the traffic reporter 79 compares the real-time traffic conditions with the historical measures to determine if the real-time traffic conditions represent a significant change. As with the traffic manager 70, the traffic reporter 79 can determine if real-time conditions are newsworthy in a number of ways, including looking at any change in conditions, the absolute value of the change, or the percentage change. If the real-time traffic conditions are significant, then the traffic reporter 79 sends traffic reports to the traffic managers 70 so that they may have the benefit of the most current traffic conditions. In sending the traffic reports at 290, the traffic reporter 79 may send traffic reports tailored to the geographical region in which the traffic managers 70 are located. In other words, the traffic reporter 79 will not send real-time traffic reports for a region or portion of the network that is of no concern to a traffic manager 70 but will send traffic reports to traffic managers 70 associated with that geographical region or area of the network.

One benefit in having the traffic managers 70 monitor and report on traffic conditions is that a more accurate assessment may be made of traffic conditions. The accuracy and assessment of traffic conditions improves with the number of traffic managers 70 and also with the dispersion of the traffic managers 70 throughout the network. For example, FIG. 12(C) illustrates seven traffic managers 70 dispersed throughout the continental United States, excluding Alaska. In this figure, the traffic managers 70 are dispersed throughout different regions, such as Northeast, Southeast, Midwest, Southwest, Northwest, West, and the Rocky Mountain area. This representation of the traffic managers 70 is just an example and, in practice, traffic managers 70 are preferably more populated than just on a regional basis. If the traffic managers 70 were only dispersed at this regional level, then the traffic reporter 79 would have a limited amount of information that it could receive within each region from the traffic manager 70. With a greater number of traffic managers 70 dispersed within each region, the traffic reporter 79 benefits not only from additional information on geographical locations or more granular areas within each region, but also has an ability to cross-check to ensure the accuracy of the reporting from the traffic managers 70. Thus, customers are able to get more useful and accurate information from the traffic reporter 79 when more customers subscribe to these traffic reports, considering that the traffic managers associated with the customers' sites are assisting the traffic reporter 79 in gathering the traffic reports.

III. Profile Server and Profile Discovery Server

Figure 13:
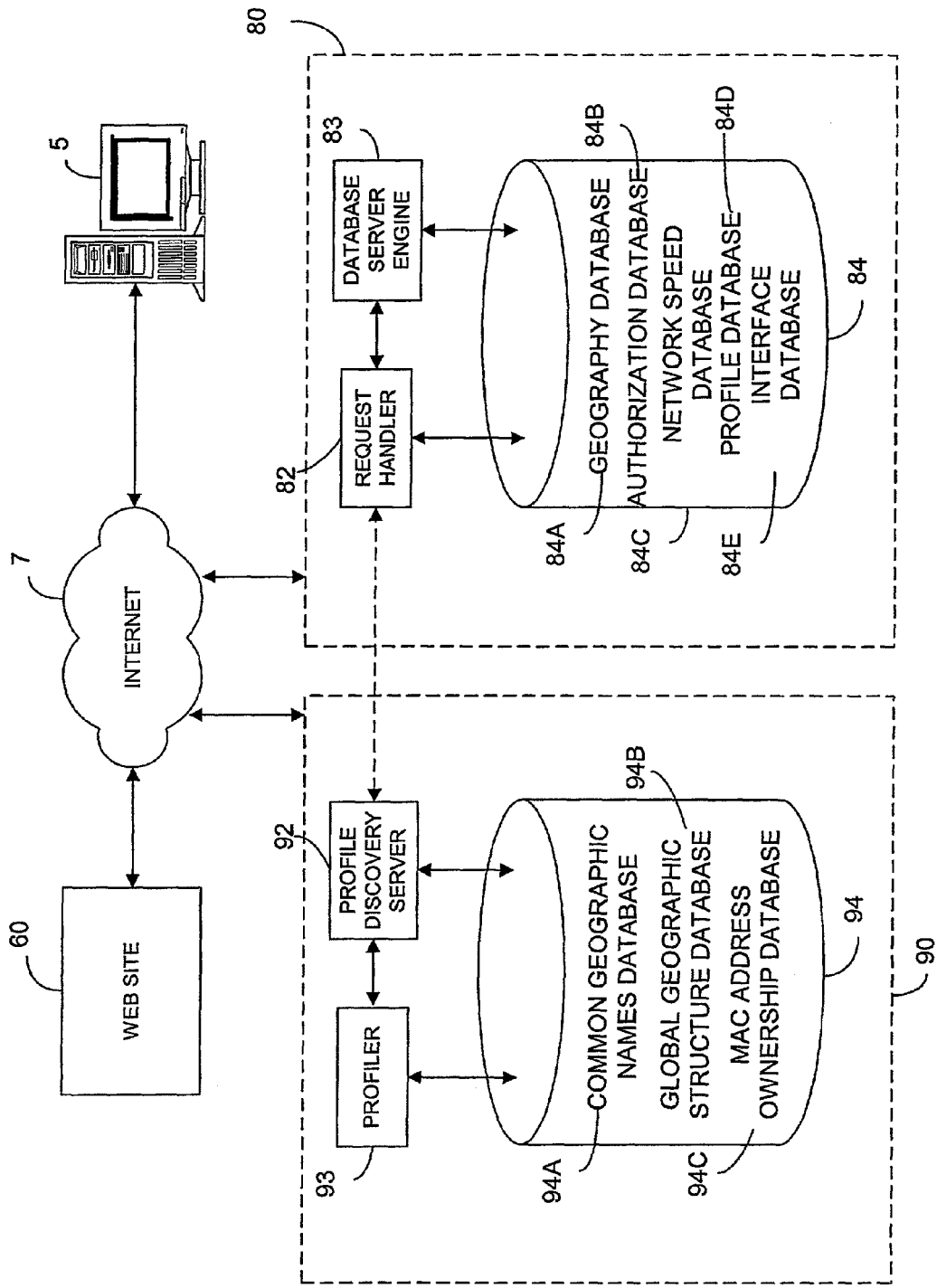
FIG. 13 is a block diagram of a network including a profile server and a profile discovery server according to a preferred embodiment of the invention.

As discussed above, the collection and determination system 50 may store geographic information on users 5 and provide this information to web sites 60 or other requesters 40. According to another aspect of the invention, based on the requests from the web sites 60 and other requestors 40, information other than the geographic location of the users 5 is tracked. With reference to FIG. 13, a profile server 80 is connected to the web site 60 through the Internet and also to a profile discovery server 90, which may also be through the Internet, through another network connection, or a direct connection. The profile server 80 comprises a request handler 82, a database server engine 83, and a database 84. As will be more apparent from the description below, the database 84 includes a geography database 84A, an authorization database 84B, a network speed database 84C, a profile database 84D, and an interface database 84E. The profile discovery server 90 includes a discoverer engine 92, a profiler 93, and a database 94. The database 94 includes a common geographic names database 94A, a global geographic structure database 94B, and a MAC address ownership database 94C.

A. Profiler

In general, the profile server 80 and profile discovery server 90 gather information about specific IP addresses based upon the Internet users' interactions with the various web sites 60 and other requestors 40. This information includes, but is not limited to, the types of web sites 60 visited, pages hit such as sports sites, auction sites, news sites, e-commerce sites, geographic information, bandwidth information, and time spent at the web site 60. All of this information is fed from the web site 60 in the network back to the database 84. This information is stored in the high performance database 84 by IP address and creates an elaborate profile of the IP address based on sites 60 visited and actions taken within each site 60. This profile is stored as a series of preferences for or against predetermined categories. No interaction is necessarily required between the web site 60 and the user's 5 browser to maintain the profile. Significantly, this method of profiling does not require the use of any cookies that have been found to be highly objectionable by the users. While cookies are not preferred, due to difficulties induced by network topology, cookies may be used to track certain users 5 after carefully considering the privacy issues of the users 5.

As users 5 access web sites 60 in the network, profiled information about the IP address of the user 60 is sent from the database 84 to the position targeter 64 or 64' at the web site 60. As explained above, the position targeter 64 or 64' or the web server 62 allows pre-set configurations or pages on the web site 60 to then be dynamically shown to the user 5 based on the detailed profile of that user 5. In addition preferences of users 5 similar to those of a current user 5 can be used to predict the content that the current user 5 may prefer to view. The information profiled could include, but is not limited to, the following: geographic location, connection speed to the Internet, tendency to like/dislike any of news, weather, sports, entertainment, sporting goods, clothing goods, etc.

As an example, two users are named Alice and Bob. Alice visits a web site, www.somerandomsite.com. This site, asks the profile server 80, such as server.digitalenvoy.net, where Alice is from and what she likes/dislikes. The database 84 has no record of Alice but does know from geography database 84A that she is from Atlanta, Ga. and notifies the web site to that effect. Using Alice's geographic information, the web site sends Alice a web page that is tailored for her geographic location, for instance it contains the Atlanta weather forecast and the new headlines for Atlanta. Alice continues to visit the web site and buys an umbrella from the site and then terminates her visit. The web site lets the profile server 80 and database 84 know that Alice bought an umbrella from the site. Bob then visits the site www.somerandomsite.com. The site again asks the profile server 80, such as a server.digitalenvoy.net, about Bob. The server 80 looks in the database 84 for information on Bob and finds none. Again though, the server 80 looks in the geography database 84A and determines that he is from Atlanta, Ga. Also, based on the data gathered in part from Alice and stored in profile database 84D, the profile server 80 infers that people from Atlanta, Ga. may like to buy umbrellas. The site uses Bob's geographic information and the fact that Atlantans have a propensity to buy umbrellas to send Bob a web page with Atlanta information, such as the weather and news, and an offer to buy an umbrella. Bob buys the umbrella and the site sends this information to the server 80, thereby showing a greater propensity for Atlantan's to buy umbrellas.

In addition, if the profile stored in the profile database 84D in profile server 80 shows that an IP Address has previously hit several e-commerce sites and sports sites in the network and that the address is located in California, the web site can be dynamically tailored to show sports items for sale that are more often purchased by Californians, such as surf boards. This method allows for more customized experiences for users at e-commerce and information sites.

This information can also be compiled for web sites in the network or outside the network. Web sites outside of the network can develop profiles of the users typically hitting their web site. Log files of web sites can be examined and IP Addresses can be compared against the profiled IP Address information stored on the central server. This will allow web sites to analyze their traffic and determine the general profile of users hitting the site.

In order to remove "stale" information, the database server engine 83 occasionally purges the database 84 in the profile server 80. For example, a user 5 that is interested in researching information about a trip will probably not want to continue seeing promotions for that trip after the trip has been completed. By purging the database 84, old preferences are removed and are updated with current interests and desires.

B. Content Registry

In addition to the examples provided above, the profile server 80 can provide a mechanism for end users 5 to register their need for certain types of information content to be allowed or disallowed from being served to their systems. Registration is based on IP address and registration rights are limited to authorized and registered owners of the IP addresses. These owners access the profile server 80 through the Internet and identify classes of Internet content that they would want to allow or disallow from being served to their IP addresses ranges. The classes of Internet content that a particular IP address or block of addresses are allowed or disallowed from receiving is stored by the profile server 80 in the authorization database 84B. Internet content providers, such as web sites 60, query the profile server 80, which in turn queries the authorization database 84B, and identify users 5 that do or do not want to receive their content based on this IP address registry.

For example, a school registers their IP ranges and registers with the profile server 80 to disallow adult content from being sent to their systems. When an access is made from machines within the school's IP range to an adult site, the adult site checks with the profile server 80 and discovers that content provided by the adult site is disallowed from being sent to those IP addresses. Instead of the adult content, the adult site sends a notice to the user that the content within the site cannot be served to his/her machine. This series of events allows end IP address owners to control the content that will be distributed and served to machines within their control.

C. Bandwidth Registry

The profile server 80 preferably is also relied upon in determining the amount of content to be sent to the user 5. Web sites 60 dynamically determine the available bandwidth to a specific user and provide this information to the profile server 80, which stores this information in the network speed database 84C. In addition, the web site 60 examines the rate and speed by which a specific user 5 is able to download packets from the web site 60, the web site 60 determines the available bandwidth from the web site 60 to the end user 5. If there is congestion at the web site 60, on the path to the end user 5, or at the last link to the user's 5 terminal, the web site 60 limits the available bandwidth for that user 5. Based on this information, the web site 60 can dynamically reduce the amount of information being sent to the user 60 and consequently increase download times perceived by the user 5. The bandwidth information is preferably sent to the profile server 80 and stored in the network speed database 84C so that other sites 60 in the network have the benefit of this bandwidth information without having to necessarily measure the bandwidth themselves.

In order to remove "stale" bandwidth information, the database server engine 83 occasionally purges the information in the network speed database 84C. For example, congestion between a web site 60 and a user 5 will usually not persist.

D. Interface Registry

Web sites 60 also preferably are able to dynamically determine the interface that a user 5 has to view the web site 60. This user interface information may be placed in the database 84E through a registration process, may be known from the ISP, or may be detected or discovered in other ways. Personal Digital Assistant (PDA) users are shown a web site 60 with limited or no graphics in order to accommodate the PDAs limited storage capabilities. Web sites 60 query the profile server 80 when accessed by a user 5. The profile server 80, in turn, queries the interface database 84E and, if available, retrieves the type of interface associated with a particular IP address. The profile server 80 stores in the database 84E all users and informs the web site 60 of the display interface that the user 5 has. Based on this information, the web site 60 tailors the information that is being sent to the user 5.

E. Methods of Operation

Figure 14A:
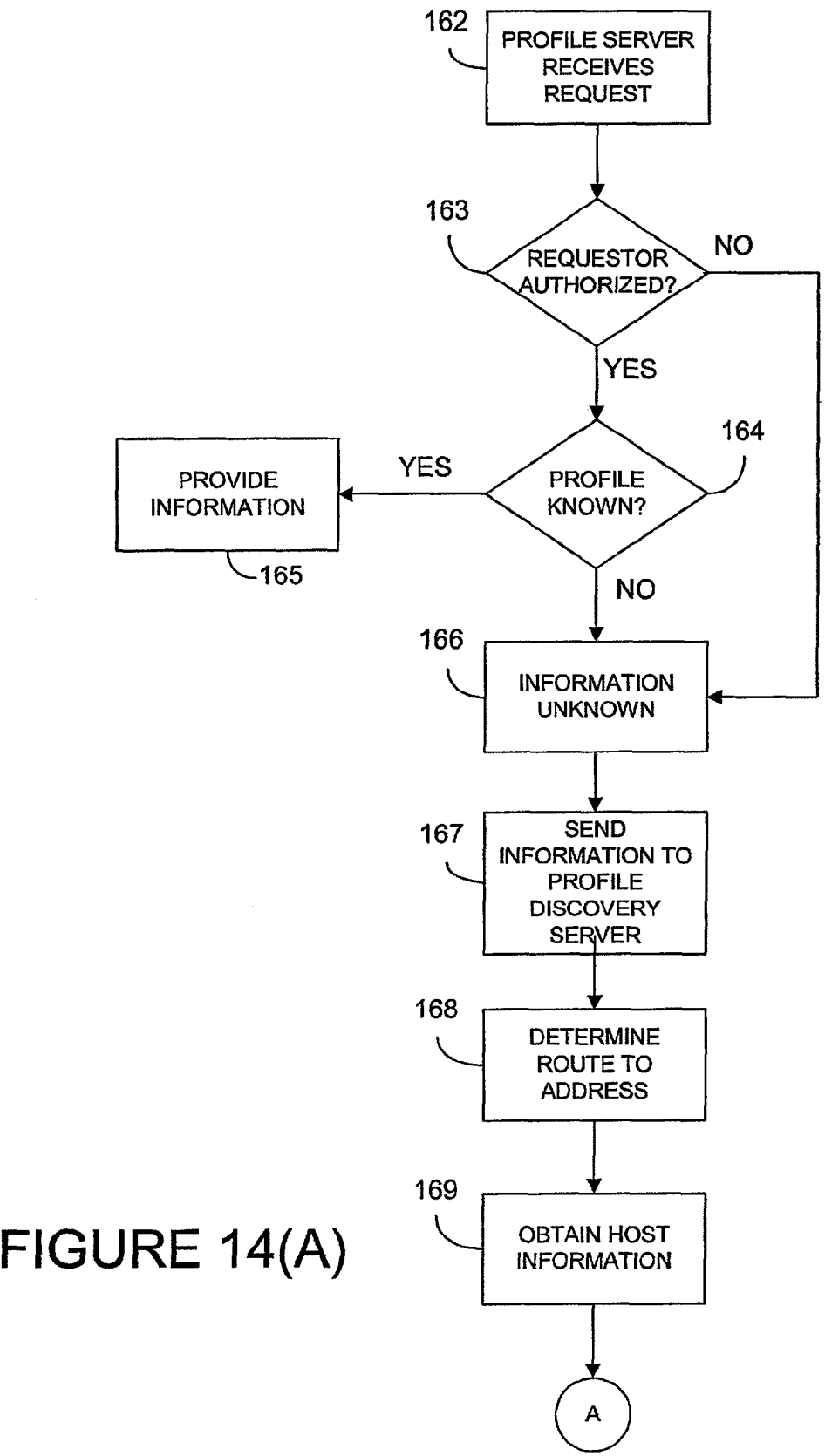
FIGS. 14(A) and 14(B) are flow charts depicting preferred methods of operation for the profile server and profile discovery server of FIG. 13.
Figure 14B:
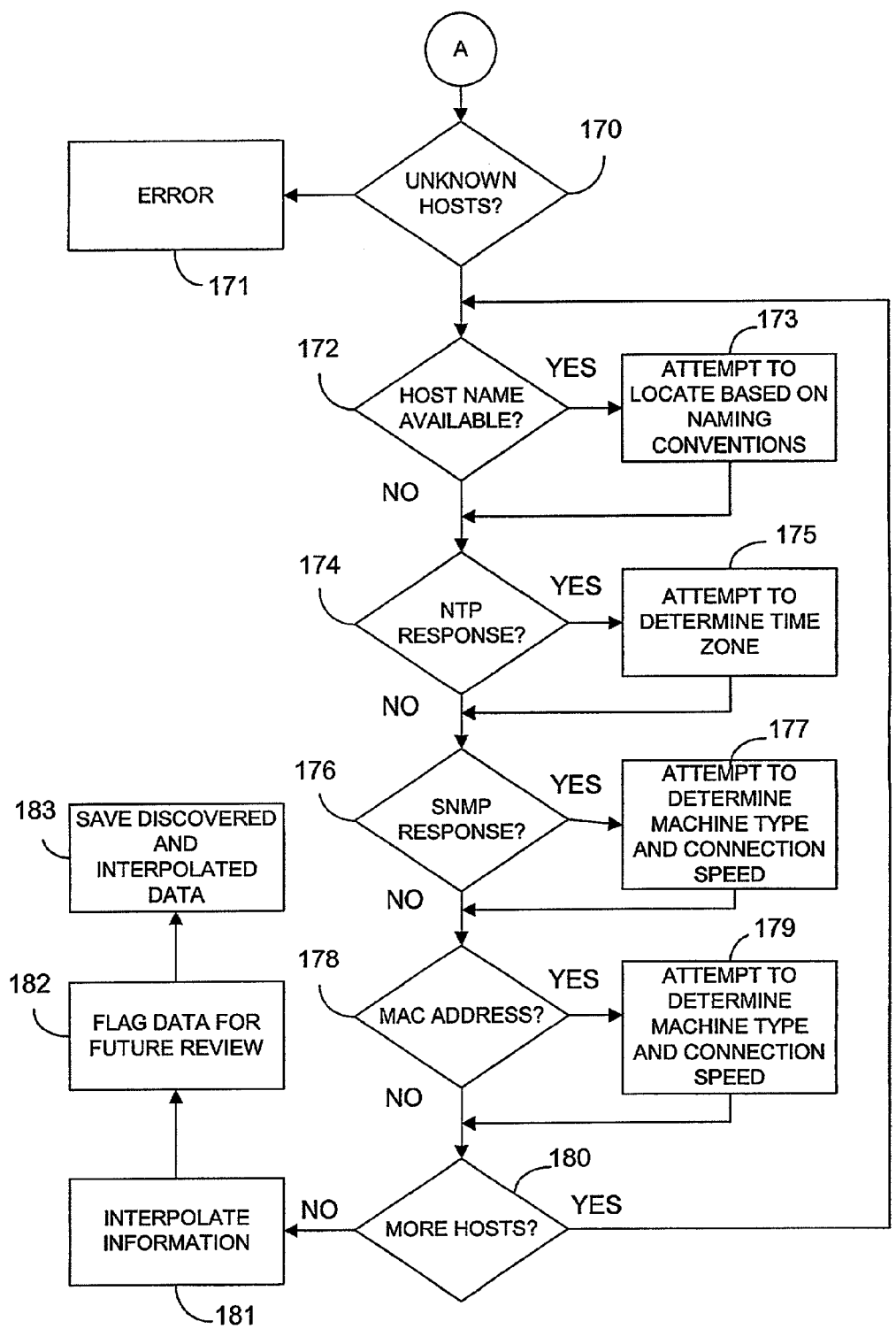

A preferred method 160 of operation for the profile server 80 and profile discovery server 90 will now be described with reference to FIGS. 14(A) and 14(B). At 162, the profile server 80 is given an IP address or host name to query. At 163, the profile server 80 determines whether the requestor is authorized to receive the information and, if not, tells the requestor at 166 that the information is unknown. The inquiry as to whether the requestor is authorized at 163 is preferably performed so that only those entities that have paid for access to the profile server 80 and profile discovery server 90 obtain the data. If the requestor is authorized, then the profile server at 164 determines whether the profile of the address is known. If the profile for that address is known, the profile server 80 sends the requested information to the requestor at 165, otherwise the profile server 80 at 166 informs the requestor that the information is unknown.

For information that is unknown to the profile server 80, the profile server 80 passes the information to the profile discovery server 90 at 167. At 168, the profile discovery server determines the route to the address, at 169 obtains known information about all hosts in route from the profile server 80, and then decides at 170 whether any unknown hosts are left in the route. If no unknown hosts are left in the route, then at 171 the profile discovery server 90 returns an error condition and notifies the operator.

For each host name left in the route, the profile discovery server 90 next at 172 determines whether a host name exists for the unknown host. If so, then at 173 the profile discovery server attempts to determine the location based on common host name naming conventions and/or global country based naming conventions. At 174, the profile discovery server 90 checks whether the host responds to NTP queries and, if so, at 175 attempts to determine the time zone based on the NTP responses. At 176, the profile discovery server 90 checks whether the host responds to SNMP queries and, if so, at 177 attempts to determine the location, machine type, and connection speed based on public SNMP responses. Next, at 178, the profile discovery server 90 checks whether the host has a MAC address and, if so, attempts to determine machine type and connection speed based on known MAC address delegations.

At 180, the profile discovery server 90 determines whether any additional unknown hosts exist. If so, the profile discovery server 90 returns to 172 and checks whether a host name is available. When no more unknown hosts exist, the profile discovery server 90 at 181 interpolates information to determine any remaining information, at 182 flags the interpolated data for future review, and at 183 saves all discovered and interpolated data at the profile server 80.

IV. Determining Geographic Locations within a Private Network

Figure 15:
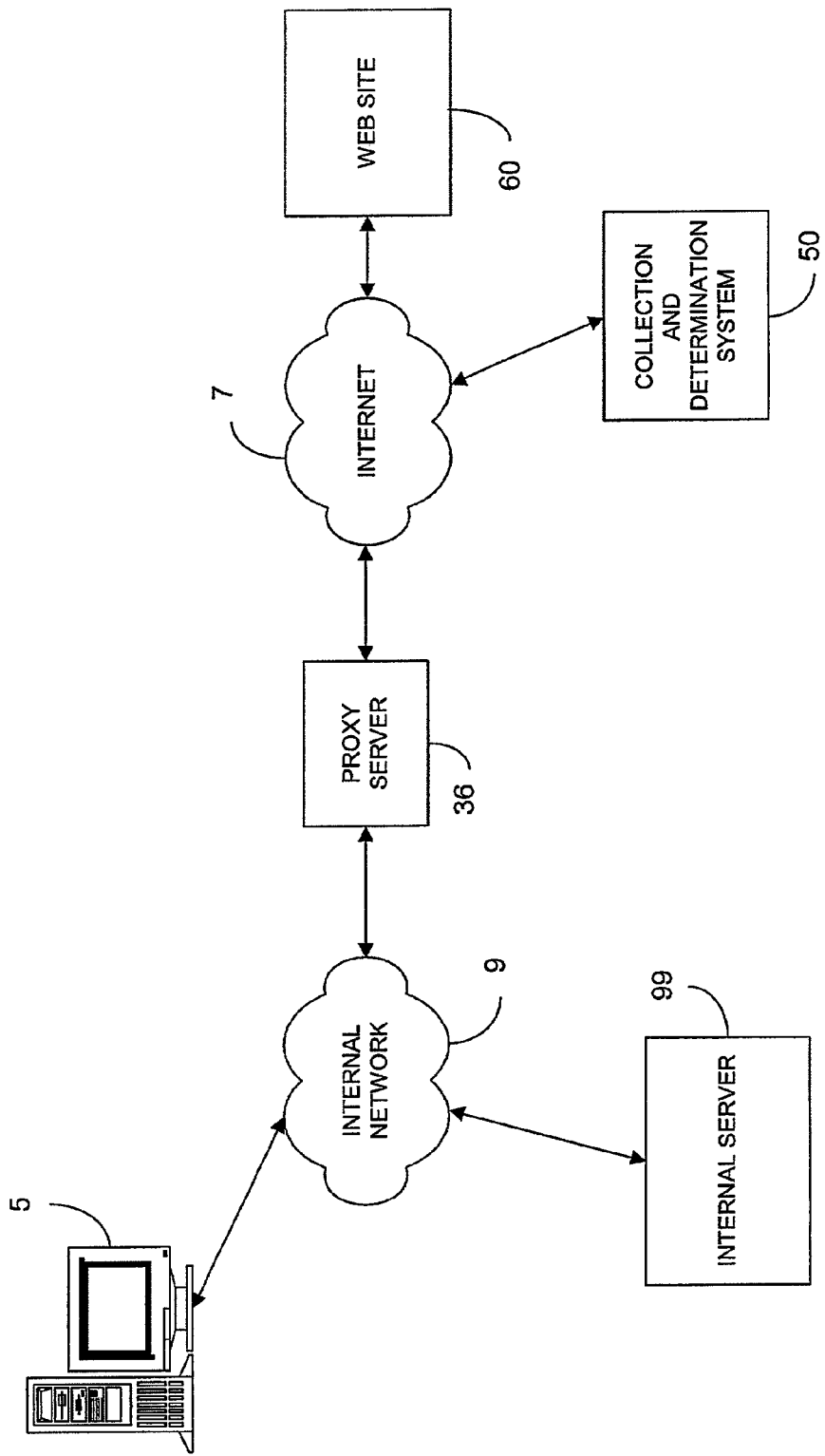
FIG. 15 is block diagram of a network having a collection system according to a second embodiment of the invention.

A network according to a second embodiment of the invention will now be described with reference to FIG. 15. The network includes both an external network 7, such as the Internet 7, and an internal network 9. The internal network 9 is constructed in such a way that each machine within the network is given an internal IP address that is paired with an external IP address. All traffic and data transportation within the internal network 9 is done via the internal IP address while any traffic that is destined to go to or come from outside of the network, such as to or from the Internet 7, uses the external IP address. In this type of network 9, at a minimum, the user 5 and the proxy server 36 or other interface to the Internet 7 must know the internal and external IP pairing in order to allow traffic to pass through the internal network 9. The private network may comprise private networks such as a commercial entity's LAN or WAN or may be a semi-private network, such as AOL's network.

In this network 9, any specific external IP address can be arbitrarily paired with any internal IP address so long as the internal network 9 knows how to transport traffic to the internal IP address. As long as the internal network 9 knows the correspondence between internal and external IP addresses, any method of mapping internal to external addresses can be employed.

Because the external addresses can be arbitrary, this network 9 presents specific problems in attempting to determine the geographic location of the user 5 based on its external address. For example, an effect of this network architecture is that anyone trying to trace the network to the user 5 will see the user's IP address as being one hop away from the proxy server 36 and will not see any intermediate routers within the internal network 9. This inability to trace within the internal network 9 may defeat the determination of the geographic location of the user 5 on that network 9 because all users 5 will look like they are located at the location of the proxy server 36.

According to the invention, to determine the geographic location of the user 5 within this type of network 9, the internal network 9 must be generally stable. In other words, the numbering scheme within the internal network 9 must not change dramatically over time. Normally, for efficient routing of information within this type of network 9, internal IP addresses are allocated to exist at a certain point so that the entire internal network 9 knows how to route information to them. If this is not the case, then announcements are made in an ongoing fashion throughout the internal network 9 as to the location of the internal addresses. These continual "announcements" induce an unnecessary network overhead.

According to this embodiment of the invention, the network 9 includes an internal server 99, which may comprise a machine or set of machines, that services requests from users 5 in the internal network 9. In general, the internal server 99 accepts requests for information and accurately identifies the internal IP address of the requesting machine, such as user 5. By being able to accurately identify the internal IP address of a requesting machine, the internal server 99 maps the internal IP address of the requesting machine with the geographic location of that internal IP address in order to identify accurately the geographic location of the requesting machine.

Figure 16:
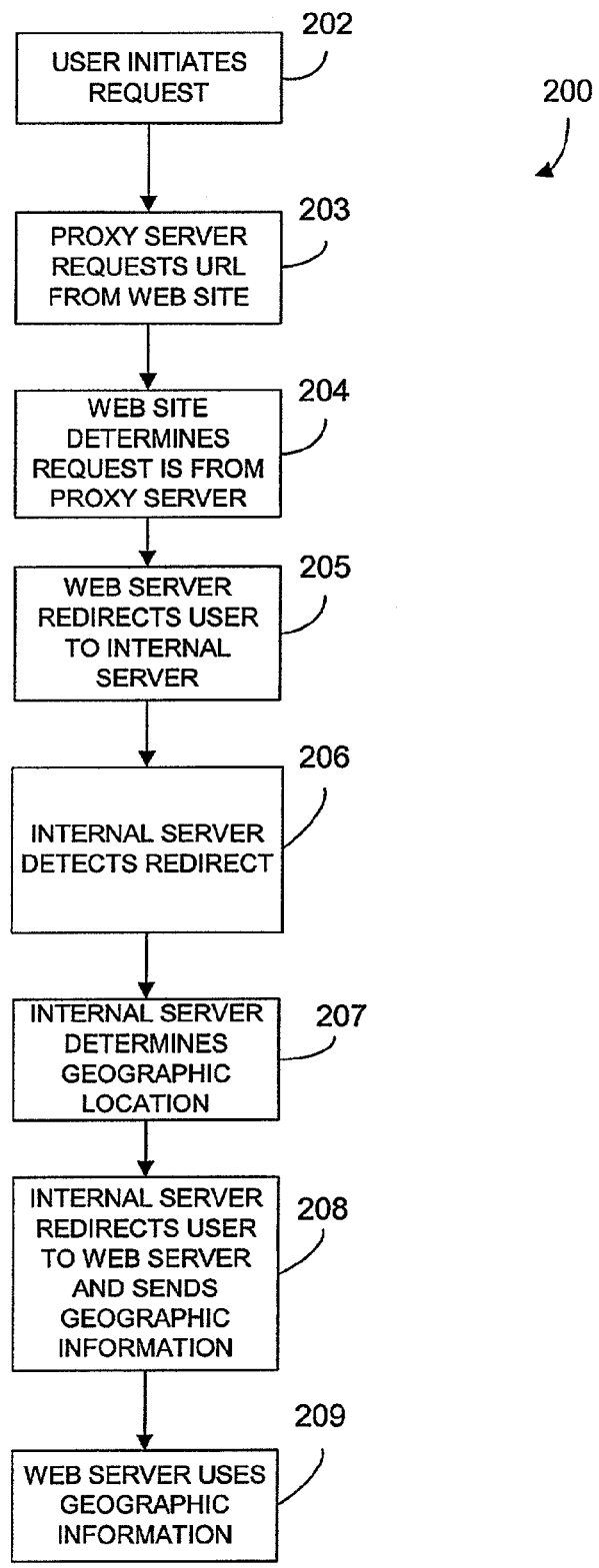
FIG. 16 is a flow chart depicting a preferred method of operation for the collection system of FIG. 15.

A method 200 by which the geographic location of the user 5 within the internal network 9 will now be described with reference to FIG. 16. At 202, the user 5 having an internal IP address $IP_{INTERNAL}$ and external IP address $IP_{EXTERNAL}$ requests information from a server outside the internal network 9. At 203, the proxy server 36 receives the request and forwards the request to the web site 60 with the user's external IP address. The web site 60 determines that the request is from a private internal network at 204. At 205, based on the $IP_{EXTERNAL}$ of the user 5, the web site 60 determines that within the network 9 the internal server 99 exists for assisting in locating the geographic location of the user 5 and redirects the user 5 to the internal server 99. Thus, as a result of this redirect, the user 5 sends a request for information to the internal server 99. At 206, the internal server 99 sees the request from the user 5 and determines that the request was redirected from the web site 60. The internal server 99 can detect the redirect based on the information requested from the internal server 99, such as based on the URL of the redirect, through the referral URL contained in the header, or in other ways.

At 207, the internal server 99 determines the geographic location of the user 5. The internal server 99 can determine the geographic location of the user 5 through the methods according to the invention. Once the internal IP address is known, the internal server 99 performs a lookup in a database having mappings between the internal private IP address and the geographic location. The database can be derived through user registration and may be maintained by the provider of the network or by some other entity. The internal server 99 can therefore query this database to obtain the geographic location of any user 5 in the network 9.

The internal server 99 may obtain geographic location information on the users 5 in other ways. For example, the internal server 99 can obtain a route to the user within the network 9, derive geographic locations of intermediate hosts, and then analyze the route to determine the geographic location of a host or user 5. As another example, the internal server 99 can obtain the geographic location directly from a database within the network 9. A database having each user's geographic location may be maintained by the proxy server 36, by the internal server 99, or by some other machine within the network 9. The internal server 99 can therefore query this database in responding to a request for the geographic location of a user and/or in building its own database of geographic locations for users 5. As yet another example, the internal server 5 may also use method 111 described with reference to FIG. 3. For example, this database may be filled in through a relationship with a provider of the network 9 who provides all of the data. The database may be derived at least in part by automatically dialing all of the network provider's dial-in points of presence (POP) and determining which private IP addresses are being used at each dial in POP. The internal server 99 can therefore determine the geographic location of the user 5 based on its $IP_{INTERNAL}$ address and geographic location mapping.

At 208, the internal server 99 redirects the user 5 back to the web site 60 with added information about the geographic location of the user 5. This geographic information may be sent to the web site by encoding the URL, through the use of cookies, or through methods. As discussed above, the web site 60 can adjust the information delivered to the user 5 based on its geographic information. The web site 60 may tailor the content, advertising, etc. before presenting such information to the user 5. The method 200 requires no intervention from the user 5 with all redirections and analysis being done automatically. Also, the method 200 of determining the geographic location of private IP addresses has no bearing on how an individual user's IP address is determined.

Figure 17:
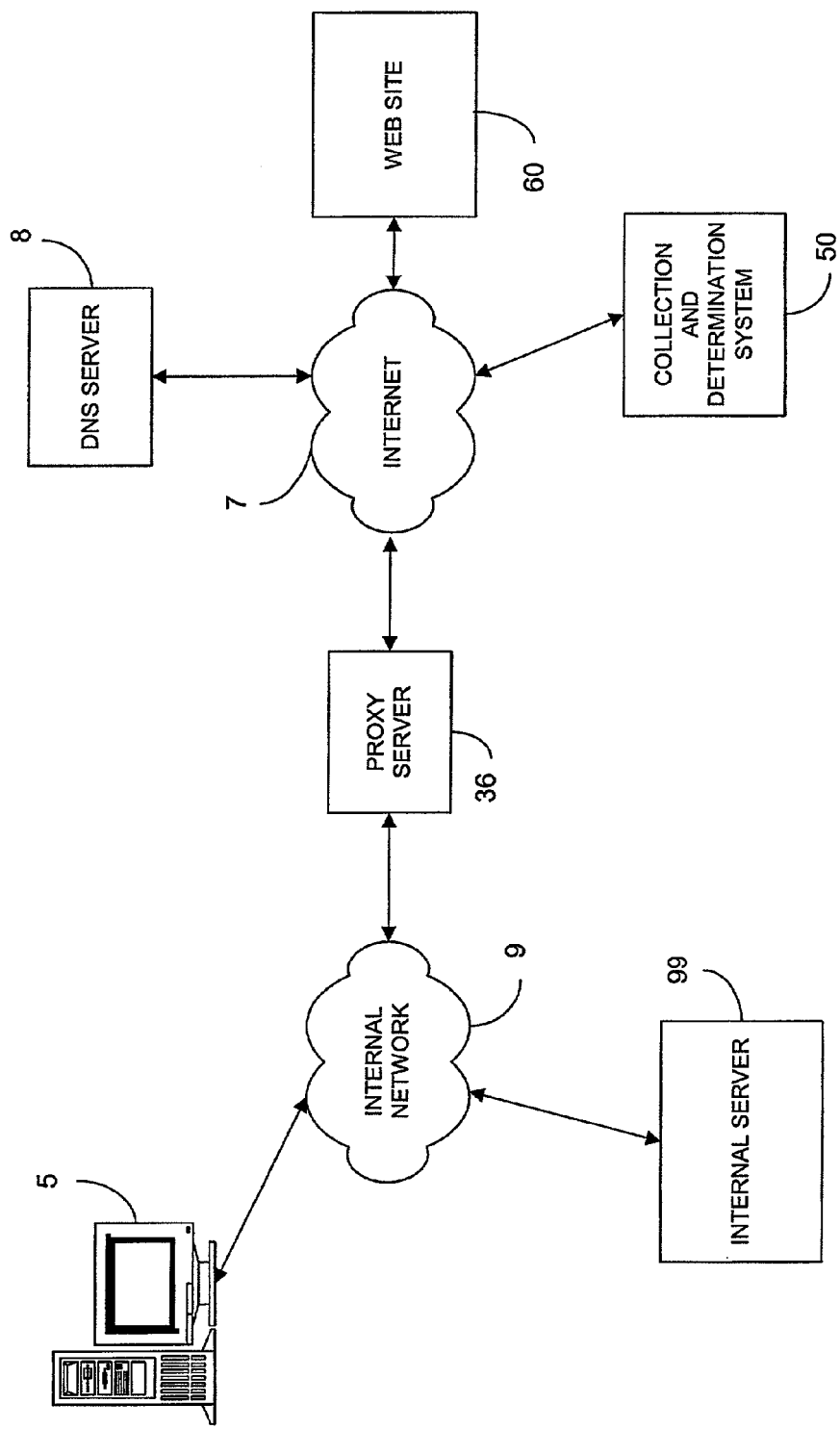
FIG. 17 is a block diagram of a network having a collection system and DNS server according to a third embodiment of the invention.
Figure 18:
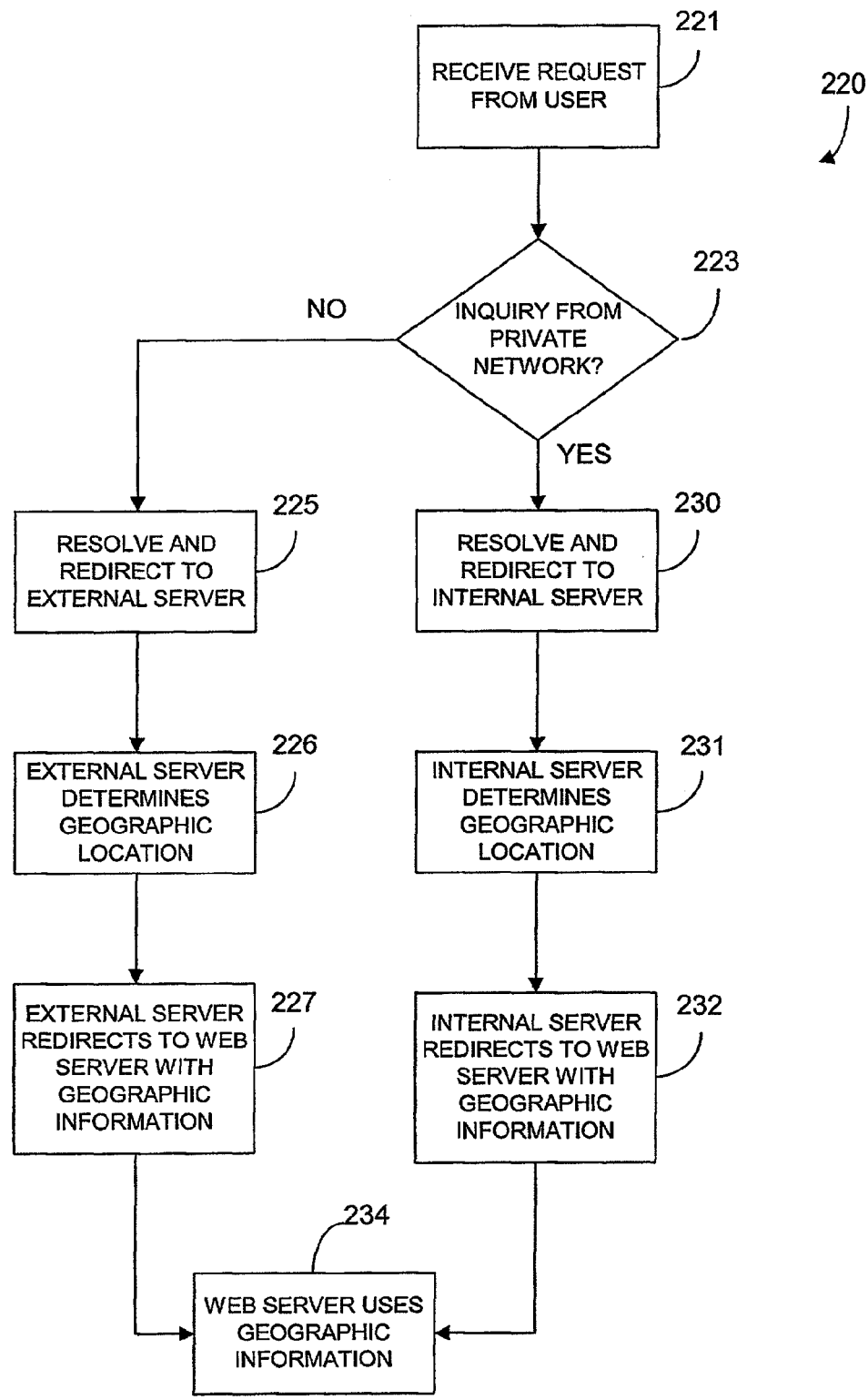
FIG. 18 is a flow chart depicting a method for resolving domain name inquiries according to another embodiment of the invention.

As explained above with reference to FIGS. 15 and 16, a request from the user 5 within the private network 9 is sent through the proxy server 36 to the web site 60 which then determines if the request originated from within the private network 9. An alternative method 220 of redirecting requests to the internal server will now be described with reference to FIGS. 17 and 18. At 221, the user 5 initiates a request and this request is passed to the proxy server 36 which first sends an inquiry to a DNS server 8 in order to obtain the IP address associated with the request. In general, the DNS server 8 receives domain name inquiries and resolves these inquiries by returning the IP addresses. With the invention, however, at 223, the DNS server 8 does not perform a strict look-up for an IP address associated the inquiry from the user 5 but instead first determines if the inquiry originated from within the private network 9. If the inquiry did not originate within the private network 9, then at 225 the DNS server 8 resolves the inquiry by returning the IP address for the external server 50. The user 5 is therefore directed to the external server 50 which determines the geographic location of the user 5 at 226 and redirects the user 5 to the web server 60 along with the geographic location information. At 234, the web server 60 uses the geographic location information in any one of a myriad of ways, such as those described above.

If the DNS server 8 decides that the inquiry did originate within the private network 9, then at 230 the DNS server 8 resolves the inquiry by returning the IP address for the internal server 99. Consequently, instead of being directed to the external server by the DNS server 8, the user 5 is directed to the internal server 99. The internal server 99 determines the geographic location of the user 5 at 231 and redirects the user 5 to the web server 60 along with the geographic location information at 232 so the web server 60 can use the information at 234. Thus, with the invention, rather than directing the user 5 from the proxy server 36 to the web server 60 and then to the internal server 99, the method 220 is more direct and efficient by having the DNS server 8 do the redirecting of the user 5.

The foregoing description of the preferred embodiments of the invention has been presented only for the purpose of illustration and description and is not intended to be exhaustive or to limit the invention to the precise forms disclosed. Many modifications and variations are possible in light of the above teaching.

In illustrating aspects of the invention, the user 5 has been represented by a personal computer (PC). As will be appreciated by those skilled in the art, users are able to access networks in numerous ways other than just through a PC. For example, the user may use a mobile phone, personal data assistant (PDA), lap-top computers, digital TV, WebTV, and other TV products. The invention may be used with these types of products and can accommodate new products as well as new brands, models, standards or variations of existing products.

In addition to using any type of product or device, the user 5 can access the network in able suitable manner. The network will, of course vary, with the product receiving the information but includes, but is not limited to, AMPS, PCS, GSM, NAMPS, USDC, CDPD, IS-95, GSC, Pocsag, FLEX, DCS-1900, PACS, MIRS, e-TACS, NMT, C-450, ERMES, CD2, DECT, DCS-1800, JTACS, PDC, NTT, NTACS, NEC, PHS, or satellite systems. For a lap-top computers, the network may comprise a cellular digital packet data (CDPD) network, any other packet digital or analog network, circuit-switched digital or analog data networks, wireless ATM or frame relay networks, EDGE, CDMAONE, or generalized packet radio service (GPRS) network. For a TV product, the network may include the Internet, coaxial cable networks, hybrid fiber coaxial cable systems, fiber distribution networks, satellite systems, terrestrial over-the-air broadcasting networks, wireless networks, or infrared networks. The same type of networks that deliver information to mobile telephones and to lap-top computers as well as to other wireless devices, may also deliver information to the PDAs. Similarly, the same types of networks that deliver information to TV products may also deliver information to desk-top computers. It should be understood that the types of networks mentioned above with respect to the products are just examples and that other existing as well as future-developed networks may be employed and are encompassed by the invention.

As described above, the invention may be used in routing Internet traffic, such as with user's requests for web pages. While the requests issued by users 5 therefore include requests sent through the World Wide Web for html pages, the traffic manager according to the invention can be used in routing or directing other types of network traffic. For example, the requests may involve not only HTML but also XML, WAP, HDML, and other protocols. Further, the invention includes requests that are generated in response to some human input or action and also requests that do not involve any human activity, such as those automatically generated by systems or devices. The traffic that can be routed with the invention therefore includes any type of traffic carried by a network or associated with use of a network.

The invention has been described with examples showing IPv4 technology in which an IP address is represented by four 8-bit integer numbers. The invention is not limited to just IPv4 but can also be used with other addressing schemes. For example, the invention may be used with IPv6 technology in which an IP address is represented by a series of six numbers.

The embodiments were chosen and described in order to explain the principles of the invention and their practical application so as to enable others skilled in the art to utilize the invention and various embodiments and with various modifications as are suited to the particular use contemplated.

What is claimed:

1. A method, comprising:
    obtaining real-time information related to network traffic traveling through a network;
    maintaining a database of historical data related to historical network traffic;
    comparing the historical data related to the historical network traffic to the real-time information related to the network traffic;
    determining if changes exist between the historical network traffic and the real-time information related to the network traffic; and, in response to an outcome of the determining step being indicative of a change greater than a threshold, performing the steps of:
        generating a traffic report containing the changes in the network traffic based on the real-time information, the changes comprising one or more of a change in response time, a change in traffic congestion, a change in available bandwidth, a change in available capacity, a change in traffic pattern, a change in latency time, or a change in latency speed, and
        transmitting the traffic report to a plurality of entities that manage routing of network traffic, each entity of the plurality of entities having an Internet Protocol (IP) address,
        wherein each entity of the plurality of entities maintains a respective database comprising historical measures of network traffic used by default in determining traffic conditions and in providing routing directions,
        wherein each entity of the plurality of entities utilizes the traffic report to update the respective database with data from the traffic report as real-time information related to the network traffic, to derive routing directions through the network and respond to changes to the real-time information related to the network traffic, and wherein the traffic report is tailored to a geographical region in which respective entities are located.

2. The method as set forth in claim 1, wherein obtaining real-time information related to the network traffic comprises analyzing network traffic.

3. The method as set forth in claim 1, wherein obtaining real-time information related to the network traffic comprises receiving the real-time information from another system.

4. The method as set forth in claim 3, wherein receiving the real-time information comprises receiving the real-time information from at least one of the plurality of entities.

5. The method as set forth in claim 1, wherein determining if changes exist comprises establishing the changes to be significant based on a change in at least some of the historical data.

6. The method as set forth in claim 1, wherein determining if changes exist comprises establishing the changes to be significant based on a magnitude of change from the historical data.

7. The method as set forth in claim 1, wherein determining if changes exist comprises establishing the changes to be significant if the change exceeds a predetermined percentage.

8. The method as set forth in claim 1, wherein transmitting the traffic report comprises transmitting the traffic report to a plurality of locations throughout the network.

9. The method as set forth in claim 1, wherein transmitting the traffic report comprises transmitting the traffic report through the Internet.

10. A server, comprising:
a memory comprising data and computer-executable instructions; and
a processor functionally coupled to the memory, wherein the processor is configured by the computer-executable instructions to:
obtain real-time information related to network traffic traveling through a network;
maintain a database of historical data related to historical network traffic;
compare the historical data related to the historical network traffic to the real-time information on the network traffic;
determine if changes exist between the historical network traffic and the real-time information related to the network traffic; and, in response to an outcome of the comparison being indicative of a change greater than a threshold, performing the steps of:
generate a traffic report containing changes in the network traffic based on the real-time information, the changes comprising a change in one or more of a response time, traffic congestion, an available bandwidth, an available capacity, a traffic pattern, a latency time, or a latency speed, and transmit the traffic report to a plurality of entities that manage routing of network traffic, each entity of the plurality of entities having an Internet Protocol (IP) address, wherein each entity of the plurality of entities maintains a respective database comprising historical measures of network traffic used by default in determining traffic conditions and in providing routing directions,
wherein each entity of the plurality of entities utilizes the traffic report to update the respective database with data from the traffic report as real-time information related to the network traffic, to derive routing directions through the network and respond to changes to the real-time information related to network traffic, and wherein the traffic report is tailored to a geographical region in which respective entities are located.

11. The server as set forth in claim 10, wherein in order to obtain real-time information on the network traffic the processor is further configured by the computer-executable instructions to analyze network traffic.

12. The server as set forth in claim 10, wherein in order to obtain real-time information on the network traffic the processor is further configured by the computer-executable instructions to receive the real-time information from another system.

13. The server as set forth in claim 12, wherein in order to receive the real-time information the processor is further configured by the computer-executable instructions to receive the real-time information from at least one of the plurality of entities.

14. The server as set forth in claim 10, wherein in order to determine if changes exist the processor is further configured by the computer-executable instructions to conclude the changes to be significant based on any change in at least some of the historical data.

15. The server as set forth in claim 10, wherein in order to determine if changes exist the processor is further configured by the computer-executable instructions to conclude the changes to be significant based on a magnitude of change from the historical data.

16. The server as set forth in claim 10, wherein in order to determine if changes exist the processor is further configured to conclude the changes to be significant if the change exceeds a predetermined percentage.

17. The server as set forth in claim 10, wherein in order to transmit the traffic report the processor is further configured by the computer-executable instructions to transmit the traffic report to a plurality of locations throughout the network.

18. The server as set forth in claim 10, wherein in order to transmit the traffic report the processor is further configured by the computer-executable instructions to transmit the traffic report through the Internet.

19. A computer program product comprising a computer-readable non-transitory storage medium having computer-executable instructions encoded thereon, the computer-executable instructions comprising:
a first set of instructions that, in response to execution, cause a processor to obtain real-time information related to traffic traveling through a network;
a second set of instructions that, in response to execution, cause the processor to maintain a database of historical data related to historical network traffic;
a third set of instructions that, in response to execution, cause the processor to compare the historical data related to the historical network traffic to the real-time information related to the traffic;
a fourth set of instructions that, in response to execution, cause the processor to determine if changes exist between the historical network traffic and the real-time information related to the traffic;
a fifth set of instructions that, in response to execution, cause the processor to generate a traffic report in response to determination of a change being greater than a threshold, the traffic report containing the changes in the network traffic based on the real-time information, said changes comprising a change in one or more of a response time, traffic congestion, an available bandwidth, an available capacity, a traffic pattern, a latency time or a latency speed; and
a sixth set of instructions that, in response to execution, cause the processor to transmit the traffic report to a plurality of entities responsible for routing network traffic, each of the plurality of entities having an Internet Protocol (IP) address, to be used by each entity of the plurality of entities to: update a respective database with data from the traffic report as real-time information related to the network traffic, the respective database comprising historical measures of network traffic used by default in determining traffic conditions and in providing routing directions, derive routing directions through the network, and respond to changes to the real-time information related to the network traffic, wherein the traffic report is tailored to a geographical region in which respective entities are located.

20. The computer program product of claim 19, wherein the first set of instructions comprises at least one instruction that, in response to execution, cause the processor to obtain the real-time information related to the network traffic by analyzing network traffic.

* * * * *